（12） United States Patent
Jeong et al.

(10) Patent No.: US 10,075,653 B2
(45) Date of Patent: Sep. 11, 2018

(54) METHOD AND ELECTRONIC DEVICE FOR IMAGE PROCESSING

(71) Applicant: Samsung Electronics Co., Ltd., Gyeonggi-do (KR)

(72) Inventors: Jin Hong Jeong, Gyeonggi-do (KR); Joo Hyung Lee, Seoul (KR); Soo Hyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 31 days.

(21) Appl. No.: 14/835,057

(22) Filed: Aug. 25, 2015

(65) Prior Publication Data

US 2016/0054903 A1 Feb. 25, 2016

(30) Foreign Application Priority Data

Aug. 25, 2014 (KR) .................. 10-2014-0110600

(51) Int. Cl.
*G09G 5/02* (2006.01)
*H04N 5/262* (2006.01)
*G06F 1/16* (2006.01)
*H04N 5/232* (2006.01)

(52) U.S. Cl.
CPC ......... *H04N 5/2621* (2013.01); *H04N 5/2624* (2013.01); *H04N 5/2628* (2013.01); *G06F 1/163* (2013.01); *G06F 2203/04806* (2013.01); *H04M 2250/52* (2013.01); *H04N 5/23293* (2013.01)

(58) Field of Classification Search
CPC ................................... G06F 3/04845
USPC ....................................... 345/661
See application file for complete search history.

(56) References Cited

U.S. PATENT DOCUMENTS

| 5,867,584 | A | * | 2/1999 | Hu | G06K 9/32 348/169 |
| 5,875,265 | A | * | 2/1999 | Kasao | G06T 11/001 382/229 |
| 6,611,744 | B1 | * | 8/2003 | Shimazaki | B60R 1/00 180/168 |
| 7,561,748 | B2 | * | 7/2009 | Suzuki | H04N 5/23216 358/538 |
| 8,971,573 | B2 | | 3/2015 | Wu | |
| 9,270,901 | B2 | * | 2/2016 | Iki | H04N 5/23293 |
| 2001/0046309 | A1 | * | 11/2001 | Kamei | G06T 7/215 382/103 |

(Continued)

OTHER PUBLICATIONS

Constructing Adaptive Complex Cells for Robust Visual Tracking Dapeng Chen et al. 2013 IEEE.*

(Continued)

*Primary Examiner* — Javid A Amini
(74) *Attorney, Agent, or Firm* — The Farrell Law Firm, P.C.

(57) ABSTRACT

A method and an electronic device are provided for image processing. The electronic device displays a composition selection guide having at least one composition item corresponding to at least one object in an image, on at least one display connected to the electronic device. An input is received relating to a selection of a composition item from the at least one composition item of the composition selection guide. At least one composition image corresponding to the composition item is acquired. The at least one composition image is displayed on the at least one display.

16 Claims, 21 Drawing Sheets

(56) References Cited

U.S. PATENT DOCUMENTS

| | | | | |
|---|---|---|---|---|
| 2004/0109012 A1* | 6/2004 | Kraus | ............... | G01C 15/00 715/700 |
| 2004/0186820 A1* | 9/2004 | Izume | ............... | G06F 17/3028 |
| 2004/0189804 A1* | 9/2004 | Borden, IV | ........ | H04N 5/23212 348/169 |
| 2004/0258152 A1* | 12/2004 | Herz | ............... | G08B 13/19669 375/240.16 |
| 2005/0134947 A1* | 6/2005 | Tsue | ............... | G06T 11/60 358/537 |
| 2006/0000911 A1* | 1/2006 | Stekel | ............... | G06K 7/10722 235/462.32 |
| 2006/0050158 A1* | 3/2006 | Irie | ............... | H04N 5/2252 348/246 |
| 2006/0119703 A1* | 6/2006 | Hibi | ............... | H04N 7/181 348/143 |
| 2009/0079824 A1* | 3/2009 | Winsor | ............... | G01S 3/7864 348/143 |
| 2009/0175496 A1* | 7/2009 | Kondo | ............... | G06K 9/32 382/103 |
| 2010/0173678 A1* | 7/2010 | Kim | ............... | H04N 5/23216 455/566 |
| 2011/0026837 A1* | 2/2011 | Kita | ............... | G06K 9/00664 382/209 |
| 2011/0118973 A1* | 5/2011 | Shih | ............... | G06K 9/00791 701/532 |
| 2012/0062732 A1* | 3/2012 | Marman | ............... | H04N 7/18 348/142 |
| 2012/0133778 A1* | 5/2012 | Shih | ............... | H04N 7/185 348/169 |
| 2014/0071287 A1 | 3/2014 | Tu et al. | | |
| 2014/0072168 A1 | 3/2014 | Wu | | |
| 2014/0240544 A1* | 8/2014 | Kim | ............... | H04N 5/23293 348/231.99 |
| 2014/0320702 A1* | 10/2014 | Tsubusaki | ............... | H04N 5/23296 348/240.3 |
| 2014/0362231 A1* | 12/2014 | Bietsch | ............... | G06T 7/20 348/169 |
| 2015/0058319 A1* | 2/2015 | Miyajima | ............... | G06F 17/30867 707/722 |
| 2015/0098000 A1* | 4/2015 | Gosangi | ............... | H04N 5/23222 348/333.02 |
| 2015/0282890 A1* | 10/2015 | Cohen | ............... | A61B 6/5288 600/424 |
| 2015/0326830 A1* | 11/2015 | Wang | ............... | H04N 5/232 348/159 |
| 2016/0320951 A1* | 11/2016 | Ernst | ............... | G06F 3/04842 |

OTHER PUBLICATIONS

StereoPasting: Interactive Composition in Stereoscopic Images Ruo-Feng Tong et al. 2013 IEEE.*

* cited by examiner

METHOD AND ELECTRONIC DEVICE FOR IMAGE PROCESSING

PRIORITY

This application claims priority under 35 U.S.C. § 119(a) to a Korean Patent Application filed in the Korean Intellectual Property Office on Aug. 25, 2014, and assigned serial number 10-2014-0110600, the content of which is incorporated herein by reference.

BACKGROUND

1. Field of the Invention

The present invention relates generally to image processing, and more particularly, to a method and device for image processing using a composition selection guide.

2. Description of the Related Art

Electronic devices, such as smart phones and tablets, provide many useful functions to users through various applications. For example, a typical electrical device has a function that enables the device to collect or receive images from other electronic devices and to display them on a display.

A typical electronic device may display images collected by a camera on a display. A user may manipulate the electronic device to acquire images including subjects. However, a user that is not familiar with manipulating an electronic device for image acquisition may have a difficulty in controlling the electronic device to acquire desired images. The selection of desired objects from images including various objects and the rearrangement of images that include the selected objects is difficult and complicated for many users.

SUMMARY

The present invention has been made to address at least the above problems and/or disadvantages and to provide at least the advantages described below. Accordingly, an aspect of the present invention provides a method and an electronic device for image processing that provides a composition selection guide function that may collect and use at least one composition image based on an object.

Another aspect of the present invention provides a method and an electronic device for image processing that may select and use various composition items.

Another aspect of the present invention provides various electronic devices to which a composition selection guide function is applied.

In accordance with an aspect of the present invention, an electronic device is provided that includes a memory configured to store a composition selection guide that has at least one composition item relating to at least one object in an image. The electronic device also includes a processor connected to the memory, and configured to display at least one composition image corresponding to a composition item, when the composition item is selected from the at least one composition item of composition selection guide.

In accordance with another aspect of the present invention, a method is provided for image processing. An electronic device displays a composition selection guide having at least one composition item corresponding to at least one object in an image, on at least one display connected to the electronic device. An input is received relating to a selection of a composition item from the at least one composition item of the composition selection guide. At least one composition image corresponding to the composition item is acquired. The at least one composition image is displayed on the at least one display.

In accordance with another aspect of the present invention, a computer readable recording medium is provided that includes a command stored in a computer readable storage medium as a programming module. The command is set to display a composition selection guide having at least one composition item corresponding to at least one object in an image, on at least one display. The command is also set to receive an input relating to a selection of a composition item from the at least one composition item of the composition selection guide. The command is also set to acquire at least one composition image corresponding to the composition item. The command is further set to display the at least one composition image on the at least one display.

In accordance with another aspect of the present invention, a computer readable recording medium is provided that includes a command stored in a computer readable storage medium as a programming module. The command is set to display a composition selection guide having at least one composition item corresponding to at least one object in an image, on at least one display. The command is also set to receive an input relating to a selection of a composition item from the at least one composition item of the composition selection guide. The command is also set to acquire at least one composition image corresponding to the composition item. The command is further set to display the at least one composition image on the at least one display.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION

Figure 1:
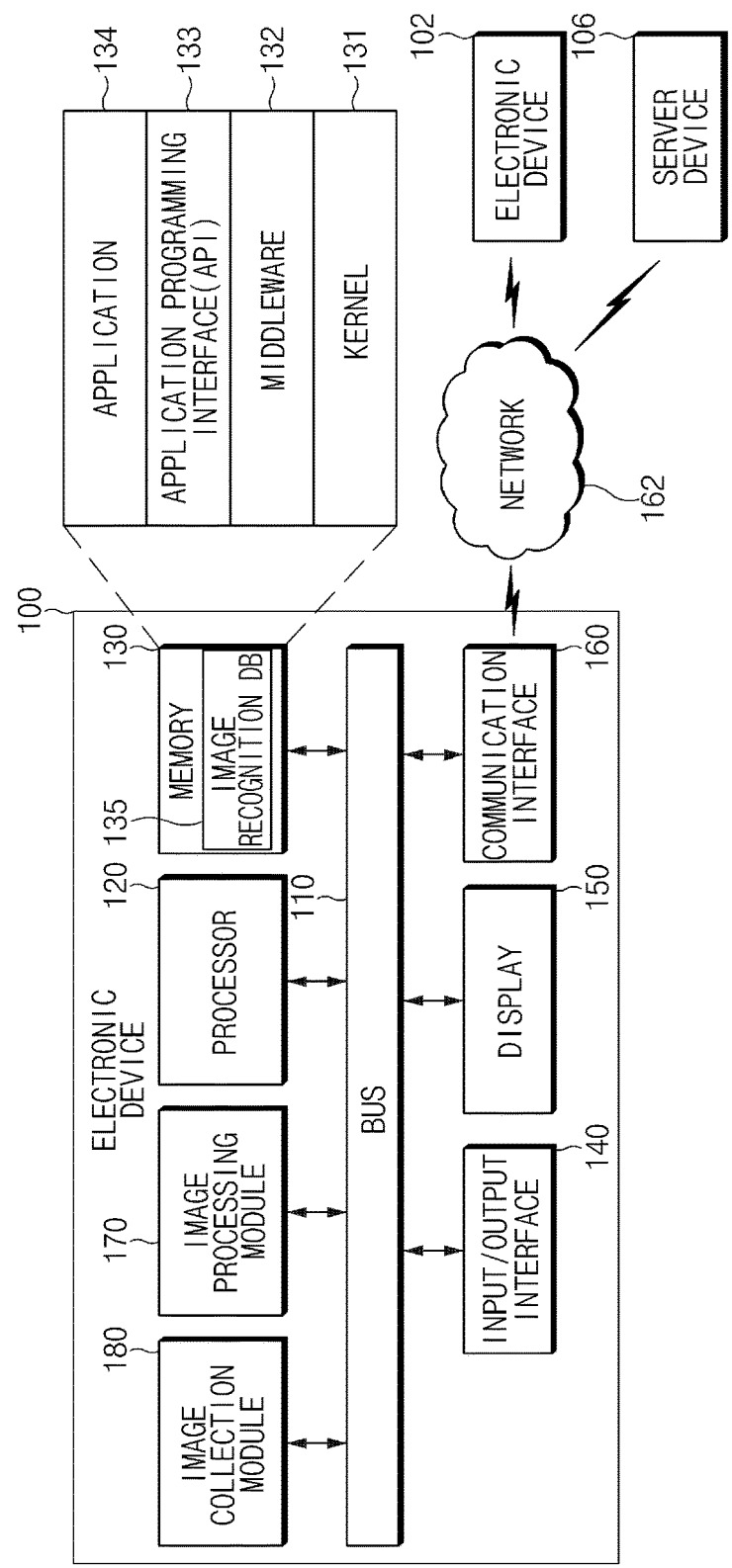
FIG. 1 is a diagram illustrating an electronic device usage environment that supports image processing, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The expressions "include", "may include", "has", or "may have", which may be used in describing the embodiments of the present invention, indicate the presence of a corresponding function, operation, component, or combination thereof, but do not exclude one or more additional functions, operations, components, or combinations thereof.

In embodiments of the present invention, the expressions "or" and "at least one of A and B" include any and all combinations of words enumerated along with the expression. For example, the expressions "A or B" and "at least one of A and B" may include A, B, or both A and B.

The expressions "a first", "a second", "firstly", "secondly", and the like, as used herein, may modify various components of embodiments of the present invention, but does not limit corresponding components. For example, the expressions above do not limit the order and/or importance of their corresponding components. The expressions above may be used to distinguish one component from another component. For example, both a first user device and a second user device are mutually different user devices. Additionally, a first component may be referred to as a second component without departing from the scope of embodiments of the present invention, and similarly, the second component may be referred to as the first component.

When any component is referred to as being "connected" to another component, it should be understood that the former can be "directly connected" to the latter, or there may be another component in between. On the contrary, when any component is referred to as being "directly connected" to another component, it should be understood that there may be no other component in between.

The terms used in describing the embodiments of the present invention are not intended to limit the embodiments of the present invention. The terms in singular form also include the plural form unless otherwise specified.

Unless otherwise defined, all terms used herein, including technical or scientific terms, have the same meanings as those generally understood by a person skilled in the art. Terms defined in generally used dictionaries should be construed to have meanings matching contextual meanings in the related art, and should not be construed as having ideal or excessively formal meanings unless otherwise defined herein.

An electronic device, according to various embodiments of the present invention, may be include an image display or capture function. For example, the electronic device may be embodied as at least one of a smart phone, a tablet personal computer (PC), a mobile phone, a video phone, an e-book reader, a desktop PC, a laptop PC, a net book computer, a personal digital assistant (PDA), a portable multimedia player (PMP), an MP3 player, a mobile medical device, a camera, and a wearable device (e.g., a head-mounted-device (HMD) such as electronic glasses, electronic clothing, an electronic bracelet, an electronic necklace, an electronic appcessory, an electronic tattoo, or a smart watch).

According to an embodiment of the present invention, the electronic device may be embodied as a smart home appliance having an image display or capture function. The smart home appliance may include at least one of a TV, a digital versatile disc (DVD) player, an audio set, a refrigerator, an air conditioner, a cleaner, an oven, a microwave oven, a washing machine, an air cleaner, a set-top box, a TV box, a game console, an electronic dictionary, an electronic key, a camcorder, and an electronic frame.

Electronic devices, and image processing by the electronic devices, according to embodiments of the present invention, are described below with reference to the accompanying drawings. The term 'user', as used herein, may indicate a person who uses an electronic device (e.g., a camera), or a device (e.g., an artificial-intelligence electronic device) that uses the electronic device.

FIG. 1 is a diagram illustrating an electronic device usage environment that supports image processing, according to an embodiment of the present invention.

Referring to FIG. 1, an electronic device 100 may communicate with a server device 106 and an external electronic device 102 through a network 162.

In the above-described electronic device usage environment, the network 162 may establish a communication channel between the electronic device 100 and the external electronic device 102. The network 162 may include, for example, network device components relating to mobile communication channel establishment. Alternatively, the network 162 may include, for example, network device components relating to interne communication channel establishment. The network 162 may support data transmission and reception between the electronic device 100 and the external electronic device 102. The network 162 may also support data transmission and reception between the electronic device 100 and the server device 106. According to an embodiment of the present invention, the network 162 may transmit an image provided by the external electronic device 102 or the server device 106 to the electronic device 100.

The server device 106 may establish a communication channel with the electronic device 100 or the external electronic device 102 through the network 162. According to an embodiment of the present invention, the server device 106 may relay video content to the electronic device 100 or the external electronic device 102. The video content that is provided to the electronic device 100 or the external electronic device 102 by the server device 106 may include a composition selection guide including at least one composition item and video information that is displayed together with, or separately from, the composition selection guide. The at least one composition item may include, for example, an item for selecting a region of a specific (or designated) size based on at least one object in an image, an item for selecting the number of objects, an item for selecting at least a portion of at least one object, an item for expanding at least one object, an item for reducing at least one object, and an item relating to the position of at least one object.

The external electronic device 102 may establish a communication channel with a communication interface 160 of the electronic device 100. For example, the external electronic device 102 may establish a short range communication channel or wired communication channel with the communication interface 160. According to an embodiment of the present invention, the external electronic device 102 may establish a Bluetooth communication channel or WiFi direct communication channel with the communication interface 160. The external electronic device 102 may provide video content to the electronic device 100. According to an embodiment of the present invention, the external electronic device 102 may provide, to the electronic device 100, video content to which a composition selection guide has been applied. According to an embodiment of the present invention, the external electronic device 102 may establish a communication channel with the electronic device 100 through the network 162. For example, the external electronic device 102 may include a cellular communication module and may establish a mobile communication channel with the electronic device 100. Alternatively, the external electronic device 102 may include a WiFi communication module and may establish a WiFi communication channel with the electronic device 100.

The electronic device 100 may establish a communication channel with at least one of the external electronic device 102 and the server device 106. The electronic device 100 may display, on a display 150, a screen relating to other devices that have established a communication channel. The screen that the electronic device 100 outputs may include video content. According to an embodiment of the present invention, the electronic device 100 may output an image collected by a camera. The electronic device 100 may output a preview image among images collected by the camera. Video content to which a composition selection guide is applied may include at least one of video content provided by other electronic devices (e.g., the external electronic device 102 or the server device 106), video collected by the camera, and video content stored in a memory 130 of the electronic device 100.

Referring to FIG. 1, the electronic device 100 includes a bus 110, a processor 120, the memory 130, an input and output interface 140, the display 150, the communication interface 160, and an image processing module 170. Additionally or alternatively, the electronic device 100 may further include an image collection module 180 (e.g., a camera).

The bus 110 may be embodied as a circuit that connects the above components to one another and relays a communication (e.g., control message, input event, or data) between the above components. For example, the bus 110 may relay an input signal input by the input and output interface 140 to at least one of the processor 120 or the image processing module 170. The bus 110 may relay video data collected by the image collection module 180 to at least one of the display 150, the memory 130, and the communication interface 160. Alternatively, the bus 110 may relay the video content stored in the memory 130 to at least one of the display 150 or the communication interface 160. Alternatively, the bus 110 may relay the video content received by the communication interface 160 to at least one of the memory 130 or the display 150. According to an embodiment of the present invention, the bus 110 may support the relaying of a control signal of the image processing module 170 relating to composition selection guide display, a composition item selection signal, a signal relating to a composition image output, and so on. The bus 110 may relay a collected or generated composition image to the memory 130.

The composition image may be an image relating to a composition corresponding to a selected composition item. For example, the composition image may be an image that includes only some of a plurality of objects in an image. Alternatively, the composition image may be an image that includes at least some regions of an object in an image. Alternatively, the composition image may be an image in which a specific (or designated) object is disposed at a specific position. Alternatively, the composition image may be an image in which a specific object is enlarged or reduced to be a predetermined size.

The processor 120 may receive, for example, a command from the above components (e.g., the memory 130, the input and output interface 140, the display 150, the communication interface 160, or the image processing module 170) through the bus 110. The processor 120 may decrypt the received command and perform operation or data processing according to the decrypted command. Such a processor 120 may be provided to include the image processing module 170. Alternatively, the processor 120 may be provided separately from the image processing module 170. In this case, the processor 120 may directly communicate with the image processing module 170 or communicate with the image processing module through the bus 110. The processor 120 may perform processing, such as, for example, displaying video data, displaying a composition selection guide, collecting a composition image according to a composition item selection, or displaying at least one of the collected composition image and the video data.

The memory 130 may store a command or data received from the processor 120 or other components (e.g., the input and output interface 140, the display 150, the communication interface 160, or the image processing module 170) or generated by the processor 120 or other components. The memory 130 includes programming modules such as, for example, a kernel 131, middleware 132, an application programming interface (API) 133, and an application 134. Each of the above-described programming modules may be configured in software, firmware, hardware, or a combination of two or more thereof.

The kernel 131 may control or manage system resources (e.g., the bus 110, the processor 120, or the memory 130) that are used for performing an operation or function implemented in other remaining programming modules, such as, for example, the middleware 132, the API 133, or the application 134. Also, the kernel 131 may provide an interface that enables the middleware 132, the API 133, or the application 134 to access and control or manage individual components of the electronic device 100.

The middleware 132 may function as an intermediary that enables the API 133 or the application 134 to communicate with the kernel 131, and thus, transmit and receive data. Also, in order to process work requests received from applications 134, the middleware 132 may use a method of providing, for example, at least one of the applications 134 with a priority that may use the system resource (e.g., the bus 110, the processor 120, or the memory 130) of the electronic device 100 to perform control (such as, scheduling or load balancing) on the work requests.

The API 133 is an interface for enabling the application 134 to control a function provided from the kernel 131 or the middleware 132. The API 133 may include at least one interface or function (e.g., a command) for file control, window control, image processing or text control, for example.

According to an embodiment of the present invention, the application 134 may include an short message service/multimedia messaging service (SMS/MMS) application, an E-mail application, a calendar application, an alarm application, a health care application (e.g., an application measuring an amount of exercise or blood sugar level), or an environment information application (e.g., an application providing atmosphere, humidity, or temperature information). Additionally or alternatively, the application 134 may relate to information exchange between the electronic device 100 and the external electronic device 102. The application relating to information exchange may include a notification relay application for relaying information to the external electronic device 102, or a device management application for managing the external electronic device 102, for example.

For example, the notification relay application may include a function of relaying notification information generated from other applications (e.g., an SMS/MMS application, an E-mail application, a health care application, and/or an environment information application) of the electronic device 100 to the external electronic device 102. Additionally or alternatively, the notification relay application may receive notification information from, for example, the external electronic device 102, and provide received information to a user. The device management application may adjust a function (e.g., the turn on/turn off operation of the external electronic device 102 itself (or some parts thereof) or the brightness (or resolution) control of a display) of at least a portion of the external electronic device 102 communicating with the electronic device 100, or manage (e.g., install, delete or update) an application operating on the external electronic device 102 or a service (e.g., a call service or a message service) provided by the external electronic device 102.

According to an embodiment of the present invention, when the external electronic device 102 is an MP3 player, the application 134 may include an application relating to music playback. Similarly, when the external electronic device 102 is a mobile medical device, the application 134 may include an application relating to health care. According to an embodiment of the present invention, the application 134 may include a video display function that includes a composition selection guide. The video display function may include at least one of the functions of displaying a preview image of an image collected by the image collection module 180, displaying an image that is collected by the image collection module 180 and stored in the memory 130, displaying an image transmitted by other electronic devices, and displaying an image stored in the memory 130. In displaying the image, the video display function may automatically display a composition selection guide on the display 150, or may display the composition selection guide according to an input signal.

According to an embodiment of the present invention, the memory 130 includes an image recognition database (DB) 135. The image recognition DB 135 may store information (e.g., at least one feature) on at least one object. The image recognition DB 135 may be used for the detection, tracking, etc., of a specific object in an image.

The input and output interface 140 may relay, a command or data input from a user through an input and output device (e.g., a sensor, a keyboard or a touch screen), to the processor 120, the memory 130, the communication interface 160, or the image processing module 170 (e.g., through the bus 110). For example, the input and output interface 140 may provide the processor 120 or the image processing module 170 with a touch event input through a touch screen. Also, the input and output interface 140 may output, through the input and output device (e.g., a speaker or display), the command or data received from the processor 120, the memory 130, the communication interface 160, or the image processing module 170 through, for example, the bus 110. According to an embodiment of the present invention, the input and output interface 140 may include a hardware key button (e.g., a home key, a side key, or a power key), jog key, keypad, etc. The input and output interface 140 may include a virtual keypad displayed on the display 150 as an input device.

According to an embodiment of the present invention, the input and output interface 140 may perform a function relating to audio processing. With respect to audio processing, the input and output interface 140 may include at least one of a speaker and a microphone in singularity or in plurality. The input and output interface 140 may output, for example, audio data relating to a screen displayed on the display 150, according to the control of the image processing module 170, through a speaker. According to an embodiment of the present invention, the input and output interface 140 may output audio data (e.g., a sound effect or audio directions) relating to displaying a composition selection guide or removing the displayed composition selection guide in the video display function. The input and output interface 140 may output audio data corresponding to at least one composition item selection in the composition selection guide. Alternatively, the input and output interface 140 may output audio data corresponding to the collection of a composition image corresponding to the selected composition item, or audio data corresponding to the output of the collected composition image. The output audio data may also be omitted depending on a user setting or whether the electronic device 100 supports it.

The display 150 may display various pieces of information (e.g., multimedia data and text data). For example, the display 150 may display a locked screen, a home screen, or a standby screen. The display 150 may display, for example, a music playback screen, a video playback screen, or a broadcast receiving screen. According to an embodiment of the present invention, the display 150 may display a composition selection guide together with video data. When at least one composition item in the composition selection guide is selected, the display 150 may display a composition image collected or generated according to the selected composition item.

The communication interface 160 may establish communication between the electronic device 100 and an external device (e.g., at least one of the external electronic device 102 or the server device 106). For example, the communication interface 160 may connect to the network 162 through wireless or wired communication to communicate with the external device. The wireless communication may include at least one of, for example, wireless fidelity (WiFi), Bluetooth (BT), near field communication (NFC), global positioning system (GPS), or cellular communication (e.g., long term evolution (LTE), LTE-advanced (LTE-A), code division multiple access (CDMA), wideband CDMA (WCDMA), universal mobile telecommunications service (UMTS), wireless broadband (WiBro), and global system for mobile communications (GSM)). The wired communication may include at least one of, for example, a universal serial bus (USB), a high definition multimedia interface (HDMI), recommended standard 232 (RS-232), and plain old telephone service (POTS).

According to an embodiment of the present invention, the network 162 may be a telecommunication network. The telecommunication network may include at least one of a computer network, Internet, Internet of Things (IoT), and a telephone network. According to an embodiment of the present invention, a protocol (e.g., a transport layer protocol, a data link layer protocol or a physical layer protocol) for communication between the electronic device 100 and the external electronic device 102 may be supported by at least one of the application 134, the API 133, the middleware 132, the kernel 131, and the communication interface 160.

The communication interface 160 may include a plurality of communication modules when the electronic device 100 supports a plurality of communication schemes. For example, the electronic device 100 may include a communication module, such as a short range communication module or direct communication module, capable of establishing a direct communication channel with the electronic device 102. The short range communication module or direct communication module may include at least one of a WiFi direct communication module, a Bluetooth communication module, and a Zigbee communication module. Also, the direct communication module may include a wired communication module such as, for example, a cable. According to an embodiment of the present invention, the communication interface 160 may receive video data from at least one of the electronic device 102 and the server device 106. The received video content may be stored or displayed on the display 150. When the video content is stored or displayed on the display 150, video data in video content may be displayed together with a composition selection guide according to the control of the image processing module 170.

The image collection module 180 may include at least one camera that collects an image. For example, the image collection module 180 may include at least one camera that is disposed at a position (e.g., a rear surface) opposite to a position (e.g., a front surface) at which the display 150 of the electronic device 100 is disposed, to collect an image. The image collection module may also include at least one camera that is disposed at a position (e.g., a front surface) at which the display 150 is disposed. Alternatively, the image collection module 180 may include at least one camera functionally connected to the electronic device 100. A preview image acquired by the at least one camera in the image collection module 180 may be displayed on the display 150. Alternatively, video collected by the image collection module 180 may be displayed on the display 150. The preview image or video may be displayed together with a composition selection guide on the display 150.

According to an embodiment of the present invention, when at least one composition item in a composition selection guide is selected, the image collection composition of the image collection module 180 may be adjusted according to the selected composition item. For example, at least one of the functions (e.g., zoom-in, zoom-out, and object tracking) of the image collection module 180 may be performed to change the composition of the image collection module 180 so that a subject is enlarged or a plurality of objects is included. Alternatively, the image collection module 180 may perform a specific function to crop around or zoom-in to a portion of a subject. For example, the image collection module 180 may crop around or zoom-in to the face region of a person or subject. According to an embodiment of the present invention, the image collection module 180 may include at least one pan-tilt zoom (PTZ) camera. Using the PTZ camera, the image collection module 180 may change an image capture angle according to the composition item selected according to the control of the image processing module 170.

The image processing module 170 may process at least some of information acquired from other components (e.g., the processor 120, the memory 130, the input and output interface 140, or the communication interface 160), and output processed information. For example, the image processing module 170 may perform at least one of video data display control of the display 150, composition selection guide display control, composition image collection control (or composition image generation control) corresponding to a composition item selection, and collected (or generated) composition image display control. According to an embodiment of the present invention, the image processing module 170 may include at least a piece of hardware (e.g., a processor or memory) or software.

Figure 2:
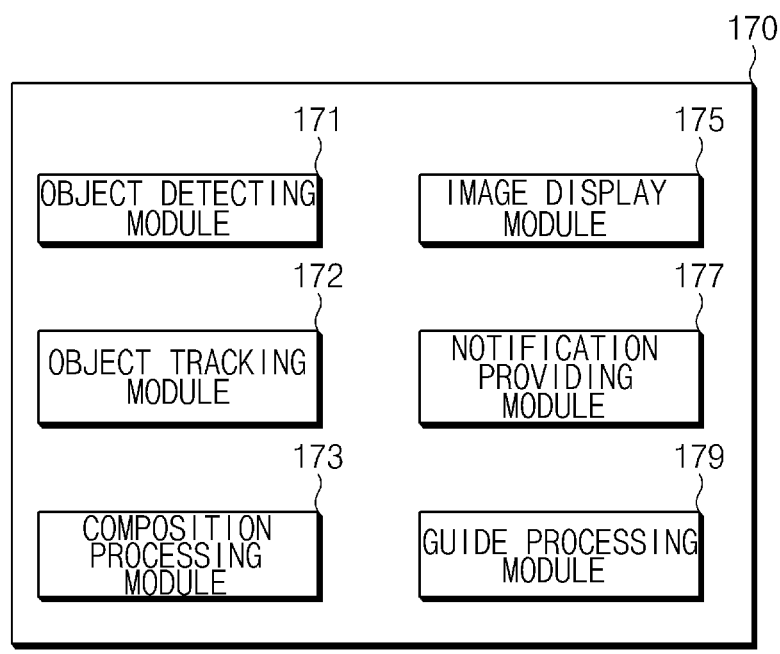
FIG. 2 is a diagram illustrating an image processing module of an electronic device, according to an embodiment of the present invention.

FIG. 2 is a diagram illustrating an image processing module of an electronic device, according to an embodiment of the present invention. Referring to FIG. 2, the image processing module 170 includes at least one of an object detecting module 171, an object tracking module 172, a composition processing module 173, an image display module 175, a notification providing module 177, or a guide processing module 179.

The image processing module 170 may provide an icon, menu, etc., to use a composition selection guide providing function. Alternatively, the image processing module 170 may automatically provide a composition selection guide when an application (e.g., a gallery or camera) is executed. Alternatively, the image processing module 170 may enable the composition selection guide to be displayed on the display 150 when an event relating to activation of the composition selection guide occurs during execution of the application.

According to an embodiment of the present invention, the image processing module 170 may enable the image collection module 180 to be activated when activation of the image collection module 180 is requested (e.g., when an input event that requests selection of an image collection module 180 related icon or activation of the image collection module 180 occurs). The image processing module 170 may enable the composition selection guide to be automatically displayed when the image collection module 180 is activated and a collected preview image is displayed on the display 150. Alternatively, the image processing module 170 may enable the composition selection guide to be automatically displayed when a video capture function is activated during activation of the image collection module 180. Alternatively, the image processing module 170 may enable an icon or menu relating to activation of the composition selection guide to be displayed on a side of the display 150, and may enable the composition selection guide to be displayed when a corresponding icon or menu is selected.

According to an embodiment of the present invention, the image processing module 170 may enable a screen interface relating to a gallery function to be displayed on the display when activation of the gallery function is requested. When gallery function related content that has been stored is selected and corresponding content is displayed on a screen, the image processing module 170 may enable the composition selection guide to be displayed as well. Alternatively, the image processing module 170 may enable the composition selection guide to be displayed on the display 150 together with video data when the video content is selected.

According to an embodiment of the present invention, the image processing module 170 may enable the composition selection guide to be displayed on a side of the display 150 when, according to activation of a video data receiving function (e.g., a broadcast receiving function or video streaming function), video data is displayed on the display 150. Alternatively, the image processing module 170 may enable an icon or menu item relating to the composition selection guide to be displayed on the display 150, and may enable the composition selection guide to be displayed on the display 150 corresponding to a corresponding icon or menu selection.

According to an embodiment of the present invention, the image processing module 170 may enable the composition selection guide to be automatically displayed when an image including a specific object (e.g., a person, a person's face, a look, a vehicle, or a building) is in the image displayed on the display 150. The image processing module 170 may perform image analysis on the image displayed on the display 150, and may determine whether a specific object is included in an analyzed image. The memory 130 may use a recognition DB corresponding to a specific object. For example, the image processing module 170 may use an external device (e.g., a server) to determine whether a specific object is included in an analyzed image.

The object detecting module 171 may perform detection of at least one object on the image displayed on the display 150 when a composition selection guide function is activated. For example, the object detecting module 171 my detect at least one person or face object based on features corresponding to a person or a person's face in an image. According to an embodiment of the present invention, the object detecting module 171 may also detect a specific face object (e.g., an object corresponding to a face image that has been stored in the electronic device 100 or a specific look) among face objects. According to an embodiment of the present invention, the object detecting module 171 may also detect an object such as a thing or background according to a setting. The object detecting module 171 may detect an object having been selected a predetermined number of times or more based on a previous object detection history in an object detection operation. Alternatively, the object detecting module 171 may also detect an object that has been selected. Alternatively, the object detecting module 171 may also detect an object having high relevancy with the user of the electronic device 100 (e.g., family to which a user of the electronic device 100 belongs). The detected object may be provided alone or objects may be provided having a high relevancy with the user at a specific position or by priority when displaying detected objects. The electronic device 100 may store an image relating to the object (e.g., family to which the user belongs or an object in which the user is interested) or the feature of the image in the memory 130. When an object is detected, the object detecting module 171 may relay detected object information to at least one of the object tracking module 172, the composition processing module 173, the guide processing module 179, or the image display module 175.

According to an embodiment of the present invention, the object tracking module 172 may extract an object in motion from the collected image (e.g., captured video or preview image). The object tracking module 172 may track the motion of the extracted object. When a change of the object (a change in object motion) is greater than or equal to a specific value (e.g., when the object is located at a specific region of a screen, when at least a portion of the object is out of the screen or the specific region, or when the size of the object is changed to be greater than or equal to the specific value or less than or equal to the specific value), the object tracking module 172 may relay change information on a corresponding object to at least one of the composition processing module 173 or the notification providing module 177.

The composition processing module 173 may control the output of a composition selection guide according to a value provided by the object tracking module 172 (e.g., the detection of at least one object in an image, or a motion change value of at least one object). The composition selection guide may include, for example, a composition item focusing on at least one object, an item providing a composition so that a specific object is disposed at a specific position on a screen, an item providing a composition so that a specific object has at least one specific size, an item providing a composition to include at least one size region based on a specific object or a point at which an input event occurs, an item adjusting an image capture condition so that a specific object has a specific color or brightness, etc.

The composition processing module 173 may display the composition selection guide at a predetermined position on the display 150. According to an embodiment of the present invention, the composition processing module 173 may enable the composition selection guide to be displayed at the edge of the display 150. According to an embodiment of the present invention, the composition processing module 173 may enable the composition selection guide to be disposed at a region adjacent to a specific object. According to an embodiment of the present invention, the composition processing module 173 may enable at least one composition item in the composition selection guide to be displayed on another display (e.g., a display different from the display on which a captured image or preview image is displayed), which is functionally connected to the electronic device 100.

The composition processing module 173 may cease displaying the composition selection guide when a specific time elapses from when the composition selection guide is displayed. Alternatively, the composition processing module 173 may provide a virtual button relating to removing the displayed composition selection guide and may remove the composition selection guide from the display corresponding to a corresponding virtual button selection. When a composition item is selected, the composition processing module 173 may relay selected composition item information to the guide processing module 179. According to an embodiment of the present invention, the composition processing module 173 may process image collection corresponding to the selected composition item without relaying the selected composition item information to the guide processing module 179. For example, the guide processing module 179 may be disposed to be included in the composition processing module 173. According to an embodiment of the present invention, the composition processing module 173 may automatically adjust an image collection state based on a specific composition value. For example, the processing module 173 may adjust the image capture condition of the image collection module 180 (zoom-in state, zoom-out state, adjustment of at least one of color or brightness, movement adjustment of an image capture region, and so on) according to the selected composition item.

The image display module 175 may control information that is displayed on the display 150 of the electronic device 100. According to an embodiment of the present invention, the image display module 175 may enable an acquired image to be displayed on the display 150, when the image collection module 180 is activated to acquire an image. For example, the image display module 175 may enable the preview image acquired by or video captured by the image collection module 180 to be displayed on the display 150. Also, the image display module 175 may enable the playback screen of a still image or video file stored in the memory 130 to be displayed on the display 150.

According to an embodiment of the present invention, the image display module 175 may enable a composition image provided by the guide processing module 179 to be displayed. For example, the image display module 175 may enable, a composition image generated by the guide processing module 179 corresponding to a composition item selection, to be overlaid with a preview image or video being captured. Alternatively, the image display module 175 may split the display according to a characteristic of the electronic device 100 (e.g., the size of the display). Alternatively, the image display module 175 may enable at least one composition image to be displayed on at least one display according to a display characteristic of the electronic device 100 (e.g., a structure including a plurality of displays, or displays of electronic devices that are connected functionally or through wireless and wired communication channels).

The notification providing module 177 may output an alarm based on information on an object change value that is provided by the object tracking module 172. For example, the notification providing module 177 may output a specific alarm corresponding to a position of an object on the current screen provided by the object tracking module 172 or corresponding to a specific object. According to an embodiment of the present invention, the notification providing module 177 may output an alarm when a specific object is disposed at a central region of a screen or at a predetermined region of a corner, when the specific object moves from the center of the screen toward the corner (or the edge of the screen) at a speed greater than or equal to a specific value, or when the specific object moves from the center of the screen toward the corner by a distance greater than or equal to a specific value. The alarm output may include, for example, at least one of a text display (e.g., a popup window or message display), an image display (e.g., a warning image or avatar display), a vibration output in a specific pattern, a specific audio data output, or a lamp flashing in a specific pattern.

The guide processing module 179 may receive, from the composition processing module 173, at least one piece of composition item selection information in a composition selection guide. When the selected composition item information is received, the guide processing module 179 may collect at least one selection composition image corresponding to a selected composition item, and may enable at least one collected selection composition image to be displayed on the display 150. According to an embodiment of the present invention, when focusing composition selection information for at least one detected face object is received, the guide processing module 179 may collect a creation region that includes a face object. The guide processing module 179 may enable the collected region to be displayed as a partial or entire screen on the display 150. According to an embodiment of the present invention, when focusing composition selection information is received for a plurality of face objects, the guide processing module 179 may collect creation regions that include the plurality of face objects. The guide processing module 179 may enable the collected regions to be displayed as a partial or entire screen on the display 150. According to an embodiment of the present invention, when focusing composition selection information is received for a plurality of face objects, the guide processing module 179 may collect creation regions that include the plurality of face objects that have been selected. The guide processing module 179 may also enable the collected regions to be displayed on the display 150 through splitting. According to an embodiment of the present invention, when at least one piece of size region related composition item selection information is received, the guide processing module 179 may extract an image that includes a region (which includes, for example, a background having predetermined size, or at least one object) having a predetermined size specified based on a selected point on the display or a predetermined size corresponding to an input event. The guide processing module 179 may enable the collected image to be displayed as a partial or entire screen on the display 150. According to an embodiment of the present invention, when composition item selection information is received, which is set so that a specific object is disposed at a specific position, the guide processing module 179 may perform composition processing so that the specific object is disposed at a specific position on a screen (e.g., the edge or center of the screen). According to an embodiment of the present invention, when composition item selection information is received that is set to have a specific color or brightness, the guide processing module 179 may enable a specific object to have the specific color or brightness. In this operation, the guide processing module 179 may enable an object, aside from the specific object, or a background object to have the specific color or brightness or a color (or brightness) corresponding to an image capture condition. The guide processing module 179 may collect (or generate) a composition image corresponding to a selected composition item, and may provide a corresponding composition image to the image display module 175. According to an embodiment of the present invention, the guide processing module 179 may enable at least a portion of the composition image to be automatically or temporarily stored in the memory 130.

Figure 3:
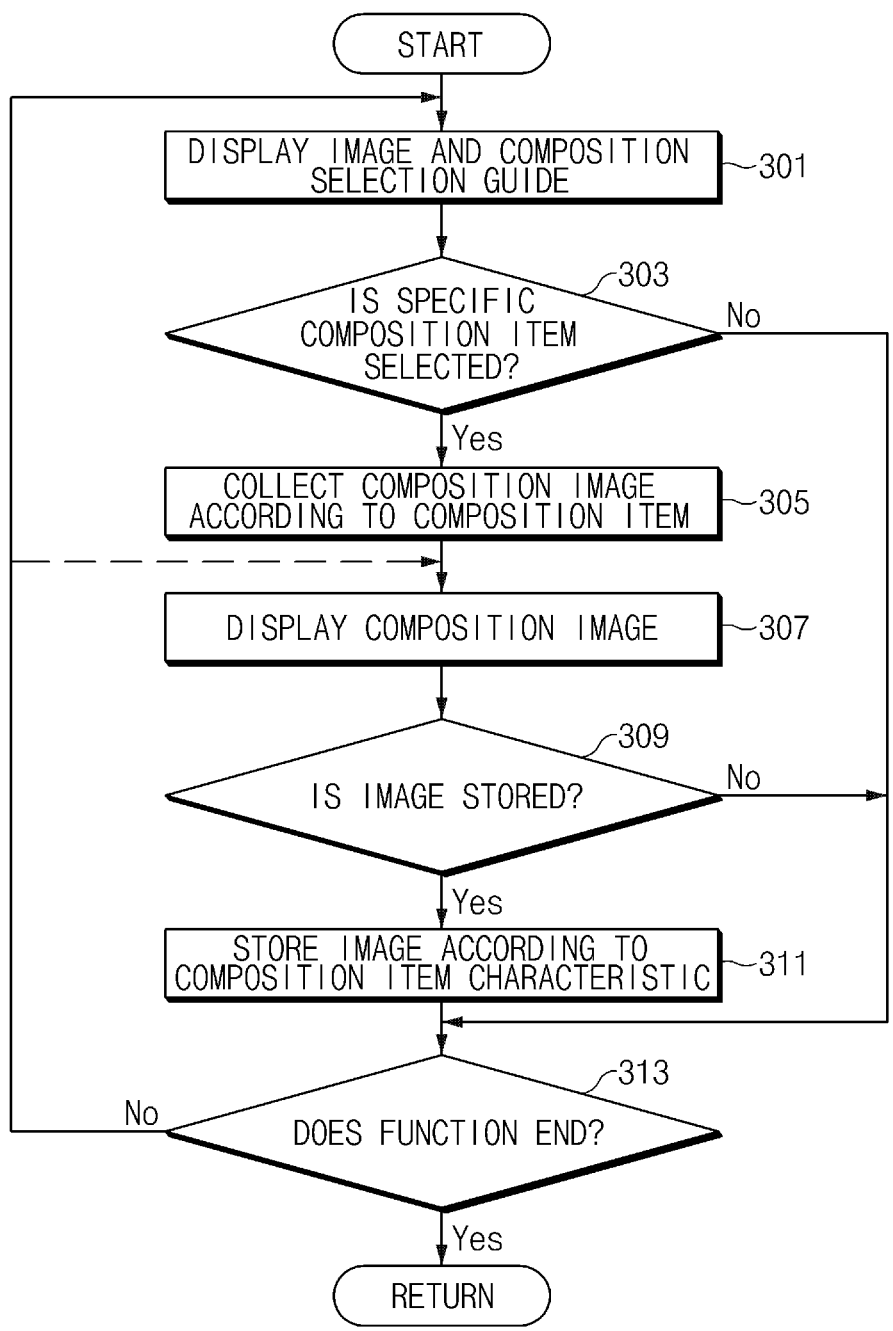
FIG. 3 is a diagram illustrating an image processing method, according to an embodiment of the present invention.

FIG. 3 is a diagram illustrating an image processing method, according to an embodiment of the present invention.

Referring to FIG. 3, in step 301, the image processing module 170 displays an image and composition selection guide. The image processing module 170 may activate the image collection module 180 to acquire and display a preview image, or display a captured video on the display 150. The image processing module 170 may enable a composition selection guide to be automatically displayed on the display 150 when the image collection module 180 is activated. Alternatively, the image processing module 170 may enable a menu item relating to the composition selection guide to be displayed, and enable the composition selection guide to be displayed on the display 150 when the menu item is selected. According to an embodiment of the present invention, the image processing module 170 may enable the composition selection guide to be displayed on the display 150 automatically or corresponding to a user selection, when a video file is played.

In step 303, the image processing module 170 determines whether there is an input event relating to selection of a specific composition item. The image processing module 170 may enable at least one composition item in a composition selection guide to be selected. For example, the image processing module 170 may process a touch event occurring in a region in which composition items are disposed, as a touch event relating to selection of a specific composition item.

In step 305, when an input event corresponding to selection of the specific composition item occurs, the image processing module 170 collects a composition image according to the specific composition item. For example, the image processing module 170 may extract a predetermined region of at least one object in a screen, or may collect a composition image having a changed magnification of zoom or angle of view so that a specific object has a predetermined size.

In step 307, the image processing module 170 displays a composition image. The image processing module 170 may enable the composition image to be displayed as an entire screen on the display 150. Alternatively, the image processing module 170 may enable the composition image to be displayed on a separate display region different from a currently collected preview image or video. Alternatively, the image processing module 170 may enable the composition image to be displayed on another functionally connected display or on a display of another electronic device.

In step 309, the image processing module 170 determines whether there is an input event relating to storing the composition image. Regarding this, the image processing module 170 may enable a menu item relating to storing the composition image to be displayed on the display 150 when the composition image is collected. The image processing module 170 may determine that the input event relating to storing the composition image has occurred, when a corresponding menu item is selected. Alternatively, the image processing module 170 may allocate a key button relating to storing the composition image.

When the input event relating to storing the composition image occurs, the image processing module 170 stores an image according to a composition item characteristic, in step 311. For example, the image processing module 170 may enable the composition image to be stored together with the currently collected video. In storing the image, the image processing module 170 may store a video in a time-synchronized manner based on when the composition image is collected. The time-synchronized stored image may be an image displayed on the display 150 when the composition image is collected. According to an embodiment of the present invention, the image processing module 170 may store the composition image in the video, and may also provide a menu item relating to a composition image search. Regarding playing a video, the image processing module 170 may enable a corresponding composition image to be displayed when a specific composition image is selected. Alternatively, the image processing module 170 may display a video frame, corresponding to when the selected composition image is collected, on the display 150 together with the composition image.

When it is determined that there is no input event relating to storing the composition image in step 309, the image processing module 170 skips step 311.

When it is determined that a specific composition item is not selected in step 303, the image processing module 170 proceeds directly to step 313.

In step 313, the image processing module 170 determines whether an end signal is received for an image processing related function. When it is determined that the end signal is not received, the image processing module 170 returns to step 301. The image processing module 170 returns to step 301 to control a preview image or video display. As an alternative, when it is determined that the end signal is not received, the image processing module returns to step 305. The image processing module 170 returns to step 305 to maintain a display state of the composition image.

Figure 4:
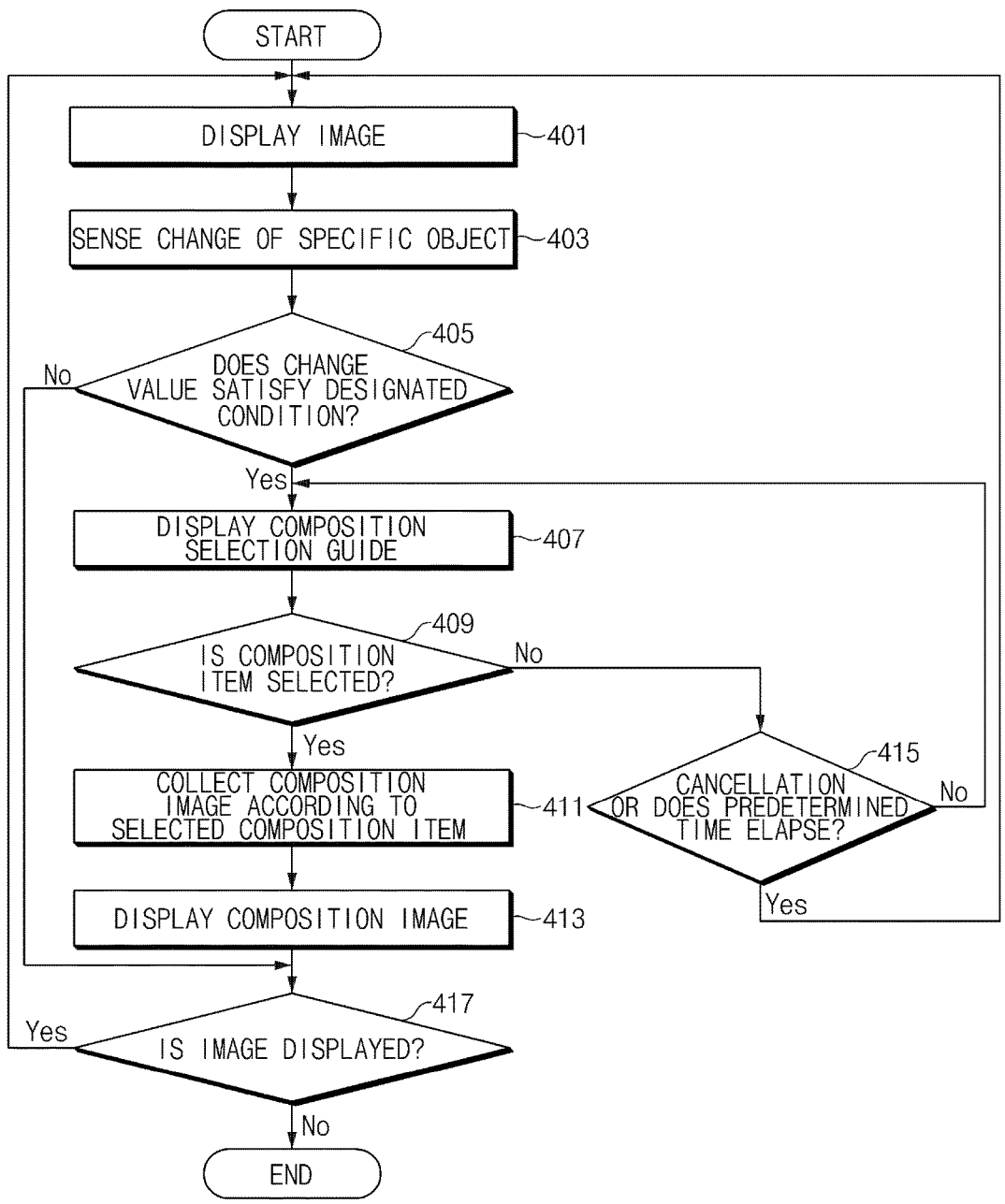
FIG. 4 is a diagram illustrating an image processing method, according to an embodiment of the present invention.

FIG. 4 is a diagram illustrating an image processing method, according to an embodiment of the present invention.

Referring to FIG. 4, in step 401, the image processing module 170 displays an image. For example, the image processing module 170 may control display of a preview image or video collected by the image collection module 180. Alternatively, the image processing module 170 may control display of a video playback screen corresponding to a request for playing an image stored in the memory 130.

In step 403, the image processing module 170 senses an object change. For example, the image processing module 170 may recognize at least one object in the preview image and detect changes in the at least one recognized object. The image processing module 170 may extract features from a frame, and compare the extracted features with specified features (e.g., a feature recognized as a person, a feature recognized as a person's face, or a feature recognized as a specific thing). The image processing module 170 may extract, from a screen, an object that is recognized as at least one of a person, face, and thing. The specified features may be stored in the memory 130 to be used for the data processing of the image processing module 170.

In step 405, the image processing module 170 determines whether an object change satisfies a specific condition. For example, the image processing module 170 may determine whether a size change value of a specific object is greater than or equal to a predetermined size, whether a position change of the specific object is greater than or equal to a specific value, or whether a current position of the specific object is within a specific range. Alternatively, the image processing module 170 may check whether an object change corresponds to a specific look (e.g., whether feature values through face recognition have feature values corresponding to a specific look or have values within a predetermined error range), whether the object change corresponds to a specific pose (e.g., whether at least one feature value among values recognizing a subject has a feature value corresponding to a specific pose or has a value within a predetermined error range), etc.

When it is determined that an object change satisfies a specific condition, the image processing module 170 displays a composition selection guide, in step 407. According to an embodiment of the present invention, the image processing module 170 may enable the composition selection guide to be displayed when the specific object is disposed in a predetermined region of a screen, e.g., an edge region. According to an embodiment of the present invention, the image processing module 170 may enable the composition selection guide to be displayed when an object of a specific size is disposed in a predetermined region of a screen, e.g., an edge region. According to an embodiment of the present invention, the image processing module 170 may enable the composition selection guide to be displayed when objects of a specific number or greater are detected on a screen. According to an embodiment of the present invention, the image processing module 170 may enable the composition selection guide to be displayed, when at least a portion of the detected object is not detected from the screen (e.g., when according to an object movement, the object is out of a screen display region). The composition selection guide may include a composition item capable of selecting at least one object in a screen, a composition item capable of changing an angle of view, a composition item relating to a zoom adjustment, etc.

In step 409, the image processing module 170 determines whether a composition item is selected.

When it is determined that the composition item is selected, the image processing module collects a composition image corresponding to the selected composition item, in step 411. For example, the image processing module 170 may adjust the image collection module 180 or the display 150 so that a region including at least one object corresponding to the selected composition item is displayed on the display 150 at a predetermined size or larger. For example, the image processing module 170 may adjust the zoom function of the image collection module 180 to adjust the size of an object to be greater than or equal to a predetermined value. Alternatively, the image processing module 170 may change an angle of view of the image collection module 180 to adjust the position of an object so that the object is disposed at a predetermined position on the screen. Alternatively, the image processing module 170 may display, on the display 150, a screen that enlarges or reduces only a predetermined region of a screen on which an object is disposed.

When it is determined that no composition item is selected, the image processing module 170 determines whether it has been cancelled or whether a predetermined time has elapsed, in step 415. For example, the image processing module 170 may remove a composition selection guide display and return to step 401, when a specific time has elapsed without the composition item selection. When the specific time has not elapsed and it has not been cancelled, the image processing module 170 returns to step 407.

In step 413, the image processing module 170 displays a composition image. When the composition image is collected (or generated) corresponding to the composition item selection, the image processing module 170 may enable a corresponding composition image to be displayed on a predetermined region of the display 150. For example, the image processing module 170 may enable the composition image and a preview image (or video) to be displayed on the display 150. Alternatively, the image processing module 170 may also provide a function capable of displaying only the composition image on the display 150, and switching to the preview image or video screen.

When it is determined that a change value does not satisfy a designated condition in step 405, the image processing module proceeds directly to step 417.

In step 417, it is determined whether an input event requesting an image display has occurred. When the input event requesting the image display has occurred, the image processing module 170 returns to step 401. According to an embodiment of the present invention, the image processing module 170 may enable step 413 to be maintained when the input event requesting the image display has not occurred.

According to an embodiment of the present invention, when an event relating to an image display function end or composition image display function end has occurred in step 417, the image processing module 170 may end an image display function or an composition image display function.

Figure 5:
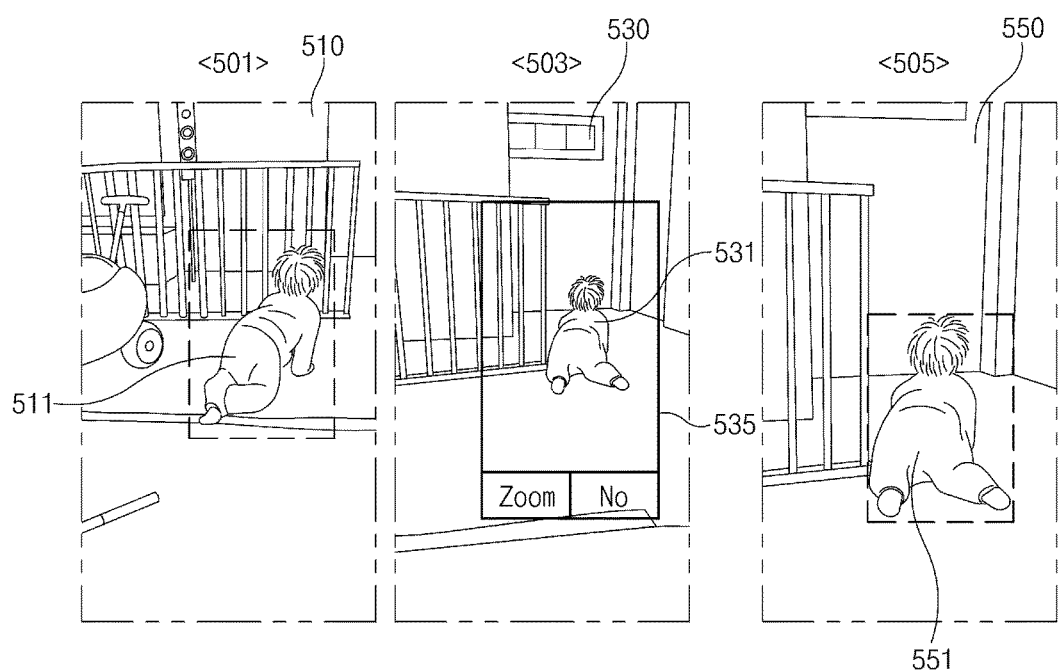
FIG. 5 is a diagram illustrating a composition selection guide display, according to an embodiment of the present invention.

FIG. 5 is a diagram illustrating a composition selection guide display, according to an embodiment of the present invention.

Referring to FIG. 5, the display 150 of the electronic device 100 outputs a screen corresponding to a request for playing a stored image, the activation of the image collection module 180, etc. According to an embodiment of the present invention, the display 150 outputs an image 510 (e.g., a preview image or video) acquired by the image collection module 180, as shown in screen 501. The image 510 includes at least one object. For example, the image 510 includes an object 511. The image processing module 170 may detect the object 511 in the image when the image 510 is collected. For example, the image processing module 170 may analyze a motion vector of the image to detect the object 511 that moves.

According to an embodiment of the present invention, when the subject moves, at least one of the position or shape of the object 511 may change. For example, when the subject moves away from the image collection module 180, an image 530 may be acquired, as shown in screen 503. The image processing module 170 may continue to detect (e.g., track) an object. Thus, the image processing module 170 may detect an object 531 along the movement of the subject. According to an embodiment of the present invention, the image processing module 170 may determine whether the detected object 531 satisfies a specific condition. For example, the image processing module 170 may determine whether at least one of the size of the object 531 or a position on the image 530 is a specific size or position. The image processing module 170 enables a composition selection guide 535 to be output on the display 150, as shown in screen 503, when the specific condition is satisfied. When any one of composition items (e.g., 'Zoom' or 'No') in the composition selection guide 535 is selected, the image processing module 170 may enable a corresponding function to be processed. For example, the image processing module 170 enables an image 550 having a changed size of an object 551 to be output on the display 150, as shown in screen 505, when 'Zoom' of the composition items is selected. The image processing module 170 may automatically apply a zoom function (zoom in or zoom out). For example, the image processing module 170 may apply the zoom function so that an object has a specific size. According to an embodiment of the present invention, the image processing module 170 may apply the zoom function so that the object continues to have the specific size. According to an embodiment of the present invention, the image processing module 170 may apply the zoom function when there is no input within a specific time (e.g., three seconds). Alternatively, the image processing module 170 may remove the composition selection guide when there is no input within the specific time. According to an embodiment of the present invention, the image processing module 170 may remove the composition selection guide from the display 150 when 'No' is selected.

Figure 6:
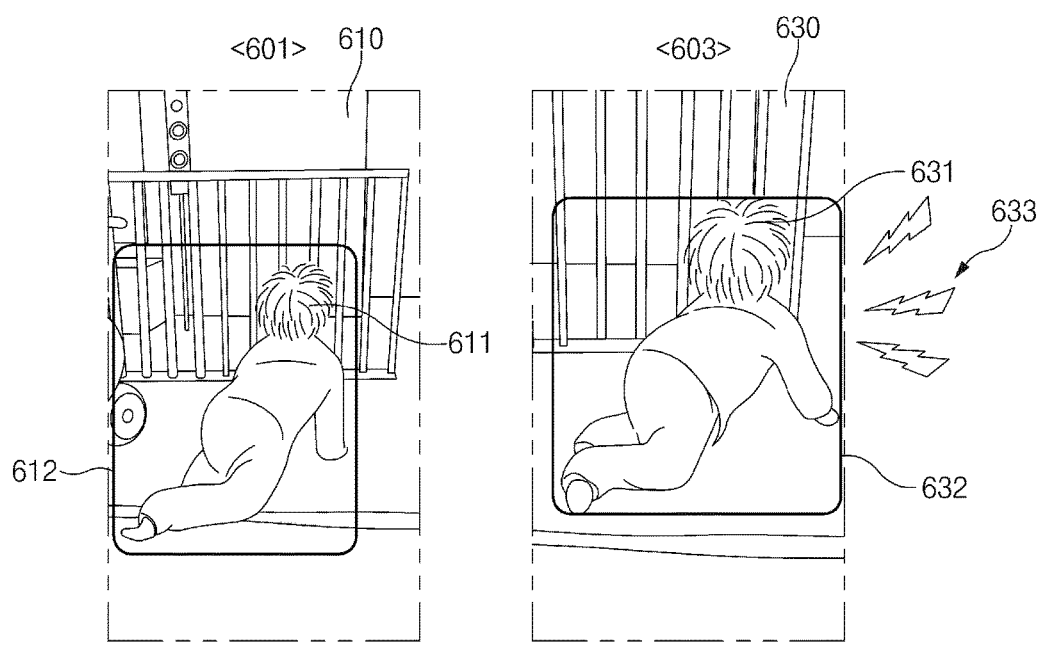
FIG. 6 is a diagram illustrating an alarm output relating to a composition selection guide, according to an embodiment of the present invention.

FIG. 6 is a diagram illustrating an alarm output relating to a composition selection guide, according to an embodiment of the present invention.

Referring to FIG. 6, the display 150 of the electronic device 100 outputs an image 610 corresponding to an image output request (e.g., image playback or image collection), as shown in screen 601. The image processing module 170 detects at least one object 611 in the image 610. According to an embodiment of the present invention, the image processing module 170 detects the object 611 relating to a person shape, in the image 610. For example, the image processing module 170 may detect the object 611 when an event (e.g., touch event) selecting the object 611 occurs. The image processing module 170 outputs a composition selection guide 612 relating to the object 611 when the object 611 is detected. The composition selection guide 612 is a predetermined region that includes at least a portion of the object 611. A subject corresponding to the object 611 may be a thing or person that may move.

When the subject moves, the image collection module 180 of the electronic device 100 may capture a subject related image in which at least one of a position or shape has changed. For example, the display 150 detects an object 631 in an image 630 when the subject moves to a predetermined position, as shown in screen 603. The composition selection guide 612 is changed to a composition selection guide 632 (i.e., at least one of a position or shape may be changed) corresponding to a change in at least one of the shape or position of the object 631.

According to an embodiment of the present invention, the image processing module 170 outputs an alarm 633 when at least one of the position or shape of the composition selection guide 632 is a specific position or shape. The image processing module 170 outputs the alarm 633 in the form of at least one of audio data, text, or an image. According to an embodiment of the present invention, the image processing module 170 may output, as the alarm 633, a vibration in a predetermined pattern, a lamp flashing in a predetermined pattern, etc., A user may recognize a change in at least one of the position or shape of the composition selection guide 612 through the alarm 633. When the composition selection guide 612 is changed to the composition selection guide 632, the user may perform an operation of changing, by the electronic device 100, the angle of view of the image collection module 180 or a zoom function corresponding to the change of the composition selection guide. According to an embodiment of the present invention, the image processing module 170 may also change at least one of the shape and position of the object 632 automatically when a specific input event (e.g., a touch event or gesture event) occurs. For example, the image processing module 170 may adjust the entire screen, an angle of view or zoom function so that the object 632 is disposed at the center of a screen.

As described above, the image processing module 170 may output guide information when the position change or shape change of the object has specified feature values (e.g., feature values relating to face recognition), is disposed in a specific composition in the current image, or matches a composition item in the composition selection guide. The guide information may be output by using at least one of, for example, text, an image, audio data, a vibration, and a lamp.

Figure 7:
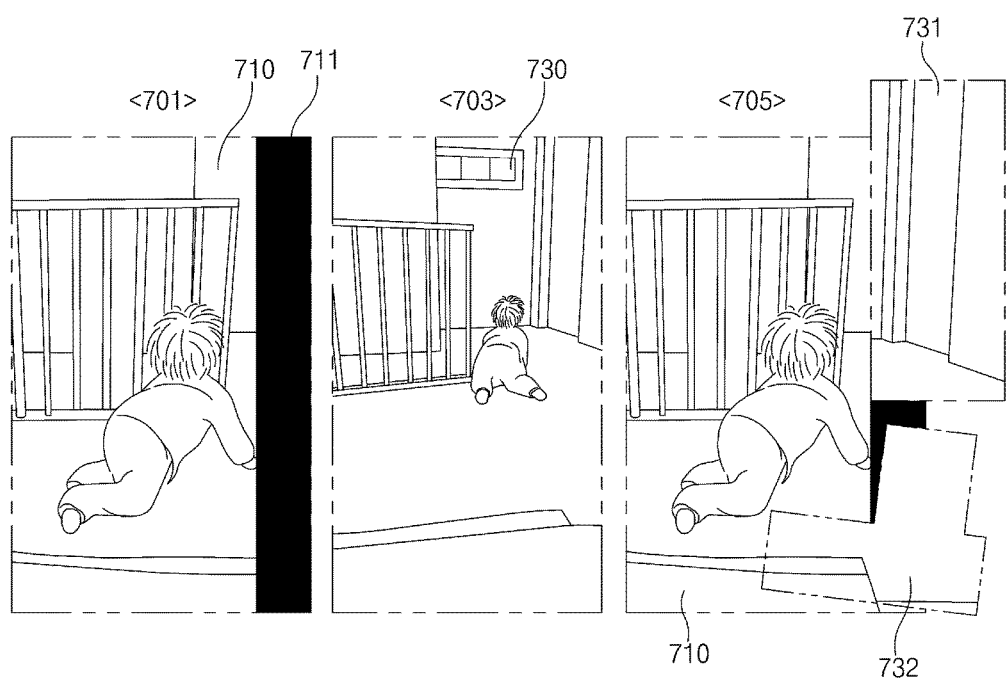
FIG. 7 is a diagram illustrating composition adjustment, according to an embodiment of the present invention.

FIG. 7 is a diagram illustrating composition adjustment, according to an embodiment of the present invention.

Referring to FIG. 7, the image collection module 180 of the electronic device 100 collects an image corresponding to a user manipulation or according to an activation state. The image processing module 170 of the electronic device 100 may detect an object. According to an embodiment of the present invention, the image processing module 170 outputs an image 710 so that a specific object is disposed at the center of the display 150, as shown in screen 701. The image processing module 170 may change the display position of an image including an object on the display 150. Thus, the display 150 outputs a non-corrected region 711 having no screen information, as shown in screen 701.

According to an embodiment of the present invention, the image processing module 170 acquires a previously captured image 730 as shown in screen 703, when there is the non-corrected region 711. For example, the image processing module 170 may collect at least one frame before the image 710 including the non-corrected region 711. The electronic device 100 may enable previous frames to be stored in the memory 130. The image processing module 170 extracts some portions from the image 730. For example, the image processing module 170 extracts an information region 731 and an information region 732, as shown in screen 705. In addition, the image processing module 170 inserts the information region 731 and the information region 732 in the non-corrected region 711 of the image 710. The image processing module 170 may analyze features on the border region of the image 710 to detect, from the image 730, the information region 731 and the information region 732 that may connect to the border region. The image processing module 170 may store an image as shown in screen 705, in which the information region has been reinforced, in the memory 130, automatically or corresponding to the occurrence of an input event.

According to an embodiment of the present invention, when the non-corrected region 711 appears, the image processing module 170 acquires at least one image 730 captured after the non-corrected region 711 appears. For example, the image processing module 170 may collect at least one frame that does not have the non-corrected region, after the image 710 including the non-corrected region 711 is acquired. As described above, for the stored image, the electronic device 100 may process the non-corrected region 711 based on at least one of a previous frame that does not have the non-corrected region, and a later frame.

Figure 8:
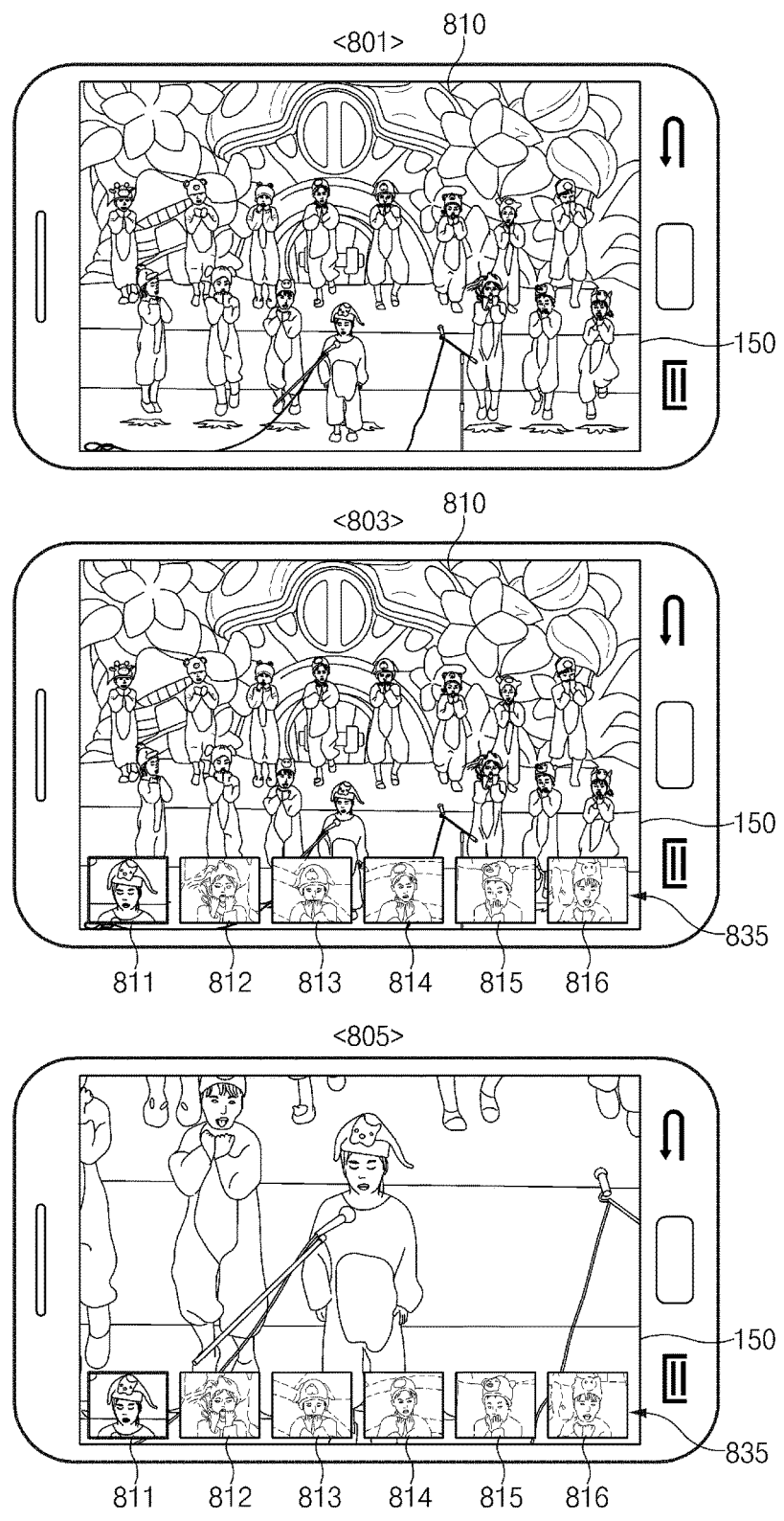
FIG. 8 is a diagram illustrating a multi-object related composition selection guide, according to an embodiment of the present invention.

FIG. 8 is a diagram illustrating a multi-object related composition selection guide, according to an embodiment of the present invention.

Referring to FIG. 8, the electronic device 100 outputs a collected (acquired) image 810 to the display 150, as shown in screen 801. The image 810 may include a plurality of people objects. The image processing module 170 may analyze the image 810 to detect objects representing people. The image processing module 170 may use features relating to detecting the people or an algorithm relating to detecting the people. The image processing module 170 generates a composition selection guide 835 that includes composition items 811-816 including at least some of the detected objects representing people. According to an embodiment of the present invention, the composition items 811-816 may include a specific part (e.g., a face or a predetermined region including the face) of a person object.

The image processing module 170 positions the composition selection guide 835 in a predetermined region of the display 150, e.g., on the lower part (or upper part, side part, etc.) of a screen, as shown in screen 803. According to an embodiment of the present invention, the image processing module 170 may position some of the composition items 811-816 on a side (e.g., left side) of the display 150 of the electronic device 100, and other composition items on another side (e.g., right side) of the display 150.

The image processing module 170 provides a display effect corresponding to a selection, as shown in screen 803, when a specific one of the composition items in the composition selection guide 835, e.g., the composition item 811, is selected. Alternatively, the image processing module 170 may display the display format of the selected composition item 811 differently from remaining composition items 812-816. For example, the image processing module 170 may display the selected composition item 811 to be brighter than other composition items, display the selected composition item 811 in a different color, or display the selected composition item 811 to be highlighted. According to an embodiment of the present invention, the image processing module 170 may also temporarily change (e.g., enlarge or reduce) the size of the selected composition item 811.

According to an embodiment of the present invention, the image processing module 170 detects an object corresponding to the selected composition item 811. Alternatively, the image processing module 170 may detect a predetermined region that includes the object corresponding to the selected composition item 811. The image processing module 170 enables the detected predetermined region to be output as an entire screen, as shown in screen 805. According to an embodiment of the present invention, the image processing module 170 adjusts the image capture condition (e.g., an angle of view or zoom in/out) of the image collection module 180 so that the object corresponding to the composition item 811 is displayed in a predetermined size. The image processing module 170 displays the predetermined region including the object corresponding to the composition item 811 on the display 150, corresponding to the adjustment of the image capture condition.

Figure 9:
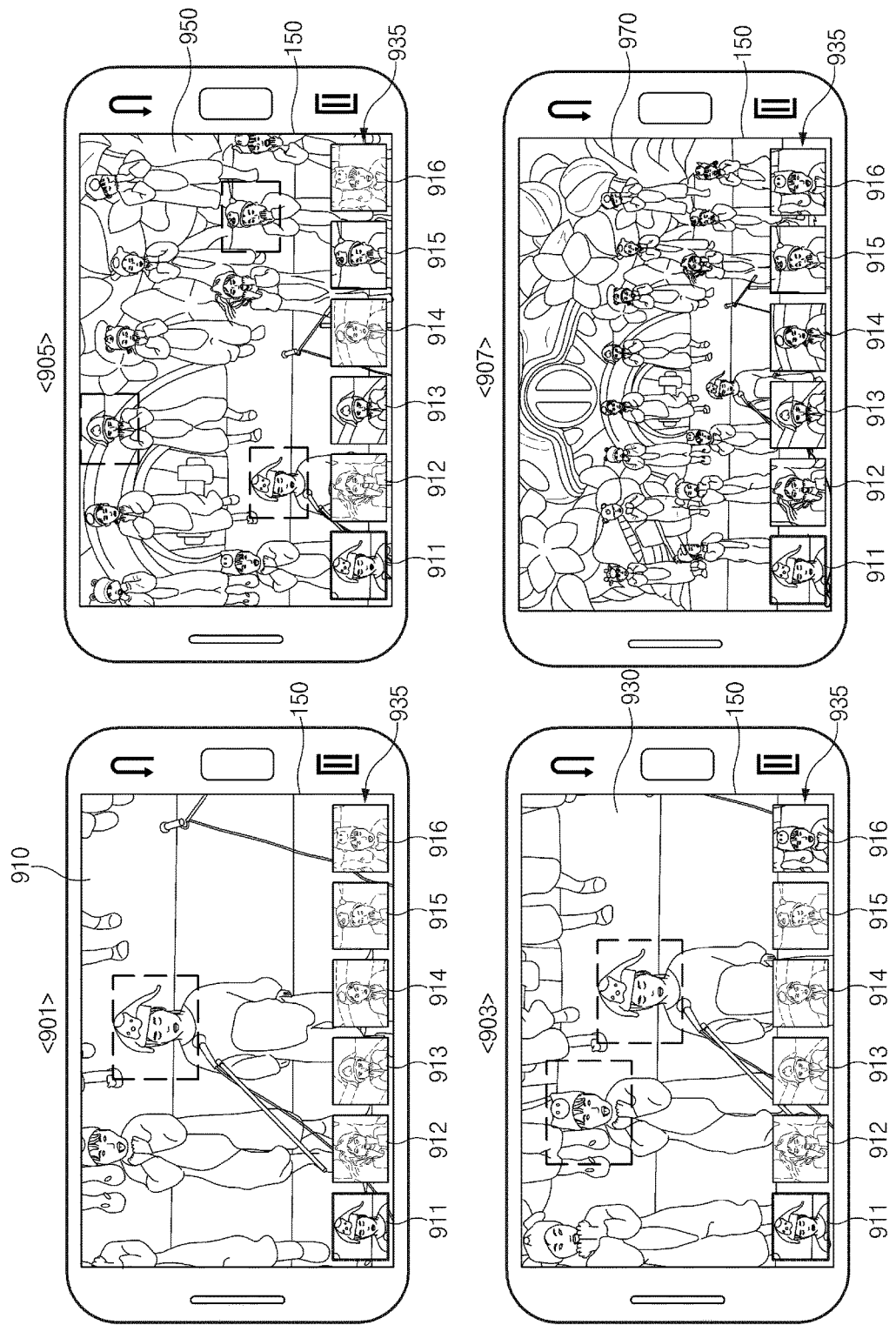
FIG. 9 is a diagram illustrating a screen according to multi-object selection, according to an embodiment of the present invention.

FIG. 9 is a diagram illustrating a screen according to multi-object selection, according to an embodiment of the present invention.

Referring to FIG. 9, the image processing module 170 detects a specific object (e.g., a person or face) from an image acquired by the image collection module 180. The image processing module 170 outputs a composition selection guide 935 including composition items 911-916 generated based on the detected object, as shown in screen 901. When the composition item 911 in the composition selection guide 935 is selected, the image processing module 170 outputs, to the display 150, an image 910 of a predetermined region including an object corresponding to the selected composition item 911. For example, the image processing module 170 may detect and enlarge a predetermined region including an object corresponding to the composition item 911 in a captured image. Alternatively, the image processing module 170 may adjust an angle of view or a zoom function to collect and display an image corresponding to a predetermined region that includes an object corresponding to the composition item 911.

According to an embodiment of the present invention, a user selects a plurality of composition items, e.g., the composition item 911 and the composition item 916. The image processing module 170 acquires a predetermined region including objects corresponding to the composition items 911 and 916 when the plurality of composition items 911 and 916 is selected. The image processing module 170 outputs, to the display 150, an image 930 corresponding to a predetermined region including multiple objects, as shown in screen 903.

According to an embodiment of the present invention, a user selects a plurality of composition items, e.g., the composition item 911, the composition item 913, and the composition item 915. The image processing module 170 acquires a predetermined region including objects corresponding to the composition items 911, 913, and 915 when the plurality of composition items 911, 913, and 915 is selected. The image processing module 170 outputs, to the display 150, an image 950 corresponding to a predetermined region including multiple objects (objects corresponding to composition items 911, 913, and 915), as shown in screen 905.

According to an embodiment of the present invention, the image processing module 170 enables an image 970 including all objects to be acquired, as shown in screen 907, when an event corresponding to composition image display's cancellation occurs. The image processing module 170 enables the acquired image 970 to be output to the display 150. Alternatively, the image processing module 170 may enable the image collection module 180 to acquire an image under a specific image capture condition (e.g., a predetermined magnification of zoom or a predetermined angle of view). The image processing module 170 collects an image based on the image collection module 180 set according to a specific image capture condition and enables the image to be output to the display 150, as shown in screen 907.

Figure 10:
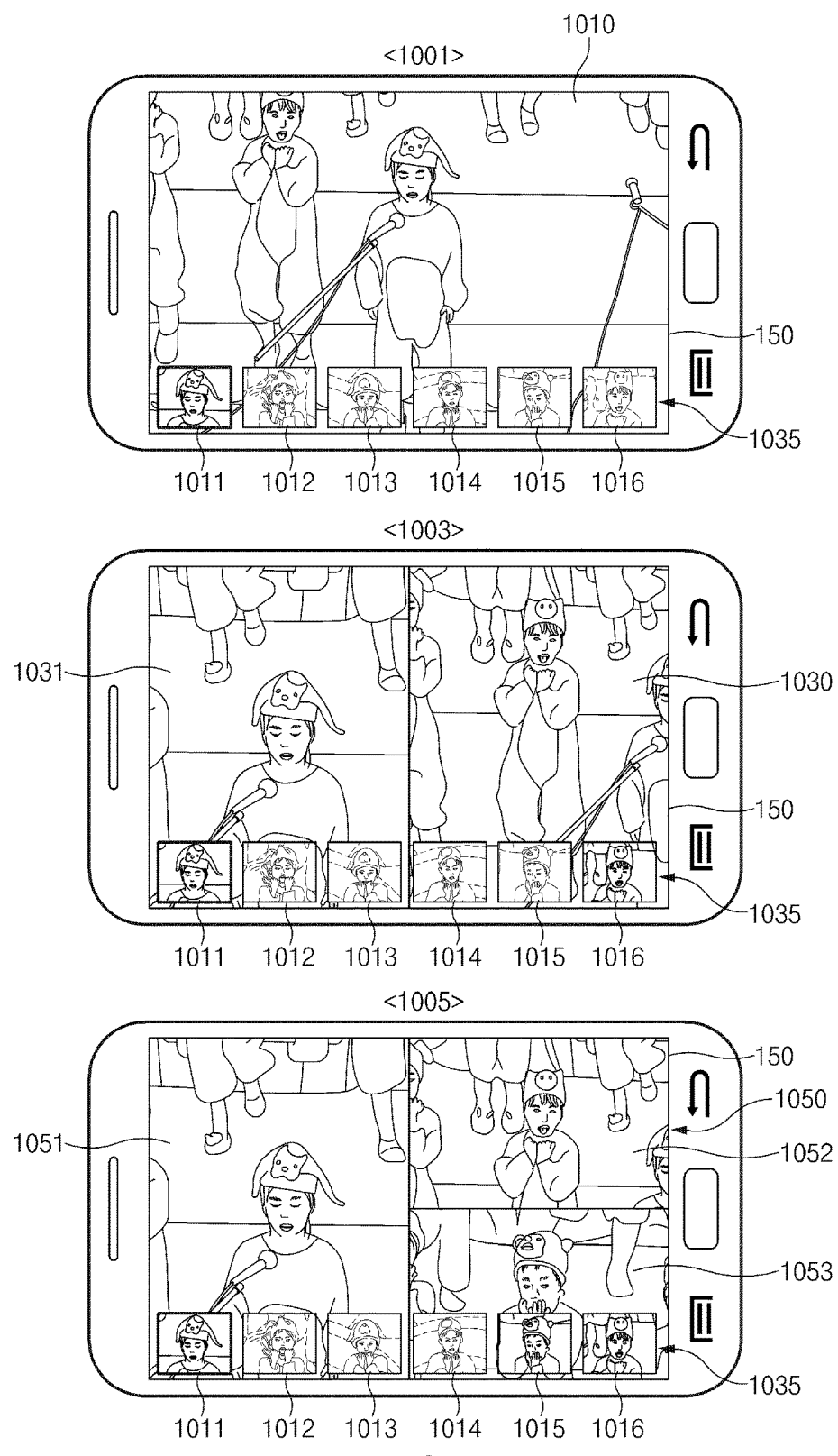
FIG. 10 is a diagram illustrating a composition image display, according to an embodiment of the present invention.

FIG. 10 is a diagram illustrating a composition image display, according to an embodiment of the present invention.

Referring to FIG. 10, the image processing module 170 detects at least one object from an image acquired by the image collection module 180. The image processing module 170 outputs a composition selection guide 1035 including at least one composition item (e.g., composition items 1011-1016) relating to the at least one detected object, as shown in screen 1001. The image processing module 170 outputs an image 1010 corresponding to a predetermined region including an object corresponding to a selected composition item 1011, when the composition item 1011 is selected.

According to an embodiment of the present invention, when a plurality of composition items, e.g., the composition item 1011 and the composition item 1016, is selected, the image processing module 170 requires a predetermined region that includes objects corresponding to the selected composition items 1011 and 1016. For example, the image processing module 170 extracts, from the acquired image, a predetermined region including objects corresponding to the composition item 1011 and the composition item 1016. The image processing module 170 outputs, to the display 150, predetermined regions including objects corresponding to the composition items 1011 and 1016. The image processing module 170 splits the display 150, outputs an object region corresponding to the composition item 1011 to a region 1031, and outputs an object region corresponding to the composition item 1016 to a region 1030. Additionally or alternatively, the image processing module 170 positions the composition selection guide 1035 on a predetermined region of a screen, e.g., on a lower part of the screen.

According to an embodiment of the present invention, when composition items 1011, 1015, and 1016 are selected, the image processing module 170 acquires predetermined regions that respectively include objects corresponding to the selected composition items 1011, 1015, and 1016. For example, the image processing module 170 extracts, from the acquired image, predetermined regions respectively including objects corresponding to the composition items 1011, 1015, and 1016. The image processing module 170 outputs, to the display 150, predetermined regions including objects corresponding to the composition items 1011, 1015, and 1016. After splitting corresponding to the number of composition items is performed, the image processing module 170 outputs an image 1050 corresponding to the composition items 1011, 1015, and 1016, as shown in screen 1005. For example, the image processing module 170 outputs an object region corresponding to the composition item 1011 to a region 1051, an object region corresponding to the composition item 1016 to a region 1052, and an object region corresponding to the composition item 1015 to a region 1053.

According to an embodiment of the present invention, the image processing module 170 may split the screen on the display 150 with the same or different sizes, according to the number of composition items. When the screen is split with different sizes, the image processing module 170 may position an object region on a relatively wide region according to the attribute of an object (e.g., the composition of an object disposed in a composition item (e.g., the whole body, upper body or face of a person)) or a composition item selection order. According to an embodiment of the present invention, the image processing module 170 may position an object related region disposed close to the center of the entire image on a relatively wide region of the split regions. According to an embodiment of the present invention, the image processing module 170 may position the composition selection guide 1035 on a predetermined region of a screen, e.g., on a lower part of the screen.

According to an embodiment of the present invention, when the image collection module 180 of the electronic device 100 includes a plurality of camera modules, the image processing module 170 may enable images corresponding to composition items to be acquired by using respective camera modules. For example, the image processing module 170 may adjust an image capture condition by controlling the angle of view and zoom function of a first camera module so that an object corresponding to the composition item 1011 may be displayed at a specific size. Also, the image processing module 170 may adjust an image capture condition by controlling the angle of view and zoom function of a second camera module so that an object corresponding to the composition item 1016 may be displayed at a specific size. Also, the image processing module 170 may control the angle of view and zoom function of a third camera module to acquire an object region corresponding to the composition item 1015. According to an embodiment of the present invention, the image processing module 170 may provide a composition module (or a composition selection guide including a composition item) for each camera module when the electronic device 100 includes a plurality of camera modules. When a composition item is selected, the image processing module 170 may adjust the image capture condition of a camera module corresponding to a corresponding composition item to acquire a composition image corresponding to a selected composition item.

Figure 11:
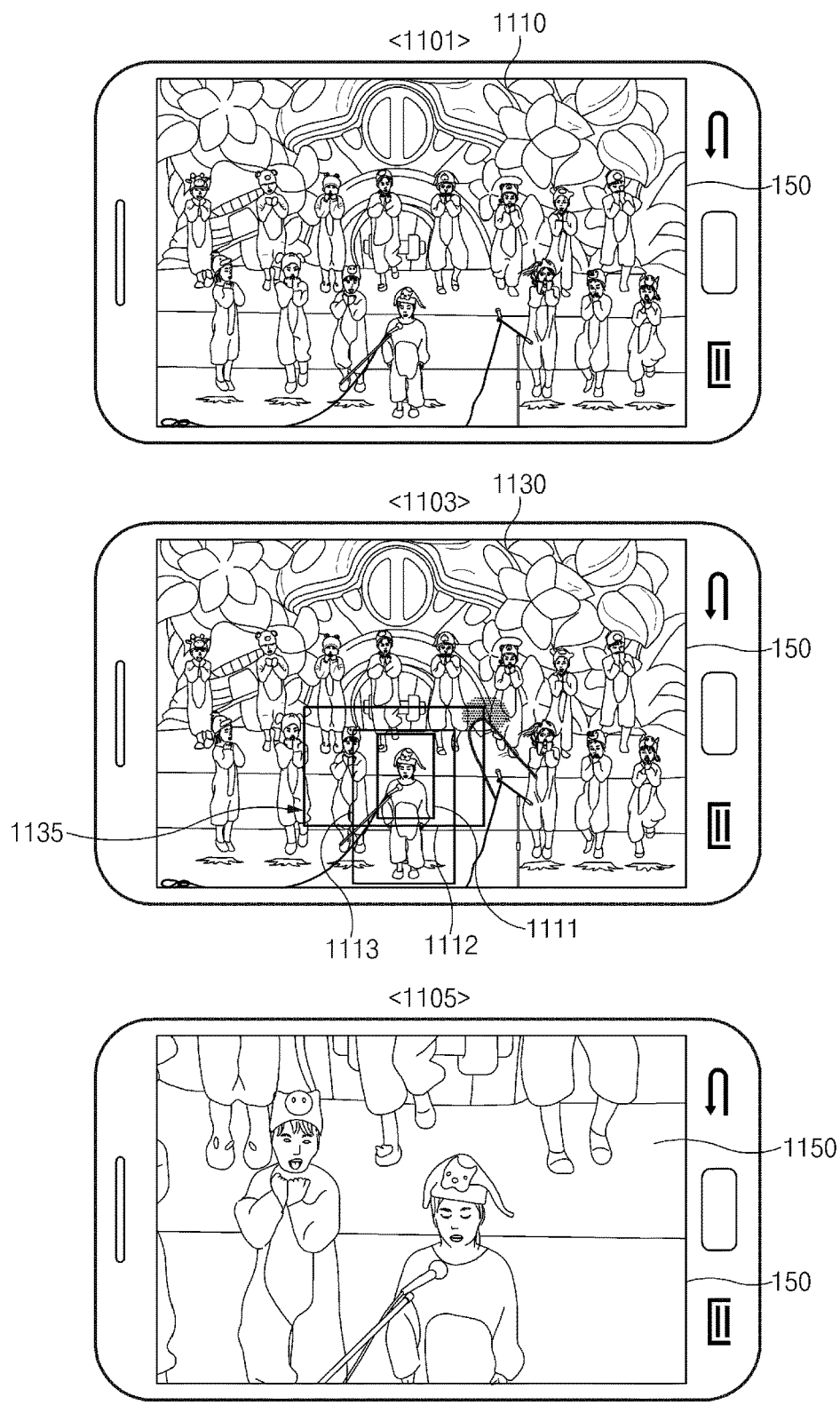
FIG. 11 is a diagram illustrating a composition selection guide, according to an embodiment of the present invention.

FIG. 11 is a diagram illustrating a composition selection guide, according to an embodiment of the present invention.

Referring to FIG. 11, the image processing module 170 outputs an image 1110 to the display 150 corresponding to the occurrence of an event, as shown in screen 1101. The image 1110 may be at least one of an image acquired by the image collection module 180, a stored image, and an image received from the outside. The image processing module 170 may activate at least a portion of a touch panel to process the occurrence of a touch event when outputting the image 1110.

According to an embodiment of the present invention, the electronic device 100 outputs a composition selection guide 1135 including at least one composition item, e.g., composition items 1111-1113, as shown in screen 1103, when a touch event is received at a predetermined point on the display 150 (or a hovering event of indicating a predetermined point). The composition item 1111 may be related to a region including a least a portion of a specific object. The composition item 1112 may be related to a predetermined range around the specific object. The composition item 1113 may be related to a region including a whole of the specific object.

According to an embodiment of the present invention, the composition items 1111-1113 may be centered around a point at which a touch event occurs. Alternatively, the composition items 1111-1113 may be centered around an object closest to the point at which the touch event occurs. The composition items 1111-1113 may move and be displayed corresponding to a change in a touch event (e.g., a touch drag). The composition selection guide 1135 may maintain a display state for a predetermined time when the touch event is released. When the predetermined time elapses, the image processing module 170 may remove the composition selection guide 1135 from the display 150. Alternatively, the image processing module 170 may also remove the composition selection guide 1135 immediately from the display 150 corresponding to the release of the touch event. The composition items 11111113 may be, for example, polygonal band shapes designating predetermined regions. The composition items 1111-1113 may be changed in a display state when they are selected (e.g., when a touch event occurs on a region on which the composition item is displayed).

According to an embodiment of the present invention, the region of the composition item may be adjusted corresponding to a position where the touch event occurs. For example, the image processing module 170 may move the region of a composition item to the center by a specific distance and display it, when a touch event is disposed at the edge of the display 150 and the region of the composition item is out of the edge of the display 150. Alternatively, the image processing module 170 may also display the composition item so that at least a portion of the composition item is away from the edge of the display 150.

According to an embodiment of the present invention, the image processing module 170 acquires an image of a predetermined range corresponding to the composition item 1112, when the composition item 112 is selected. For example, the image processing module 170 may change the image capture condition of the image collection module 180 to acquire an image of a composition corresponding to the composition item 1112. The image processing module 170 outputs an acquired image to the display 150, as an image 1150, as shown in screen 1105. The image processing module 170 removes the composition selection guide 1135 from the display 150 when the image 1150 corresponding to a selected composition item is output.

As described above, although the composition items include three composition items 1111-11113, embodiments are not limited thereto. For example, the image processing module 170 may also output a composition selection guide that includes three or more composition items, or three or less composition items, according to a setting or user adjustment.

Figure 12:
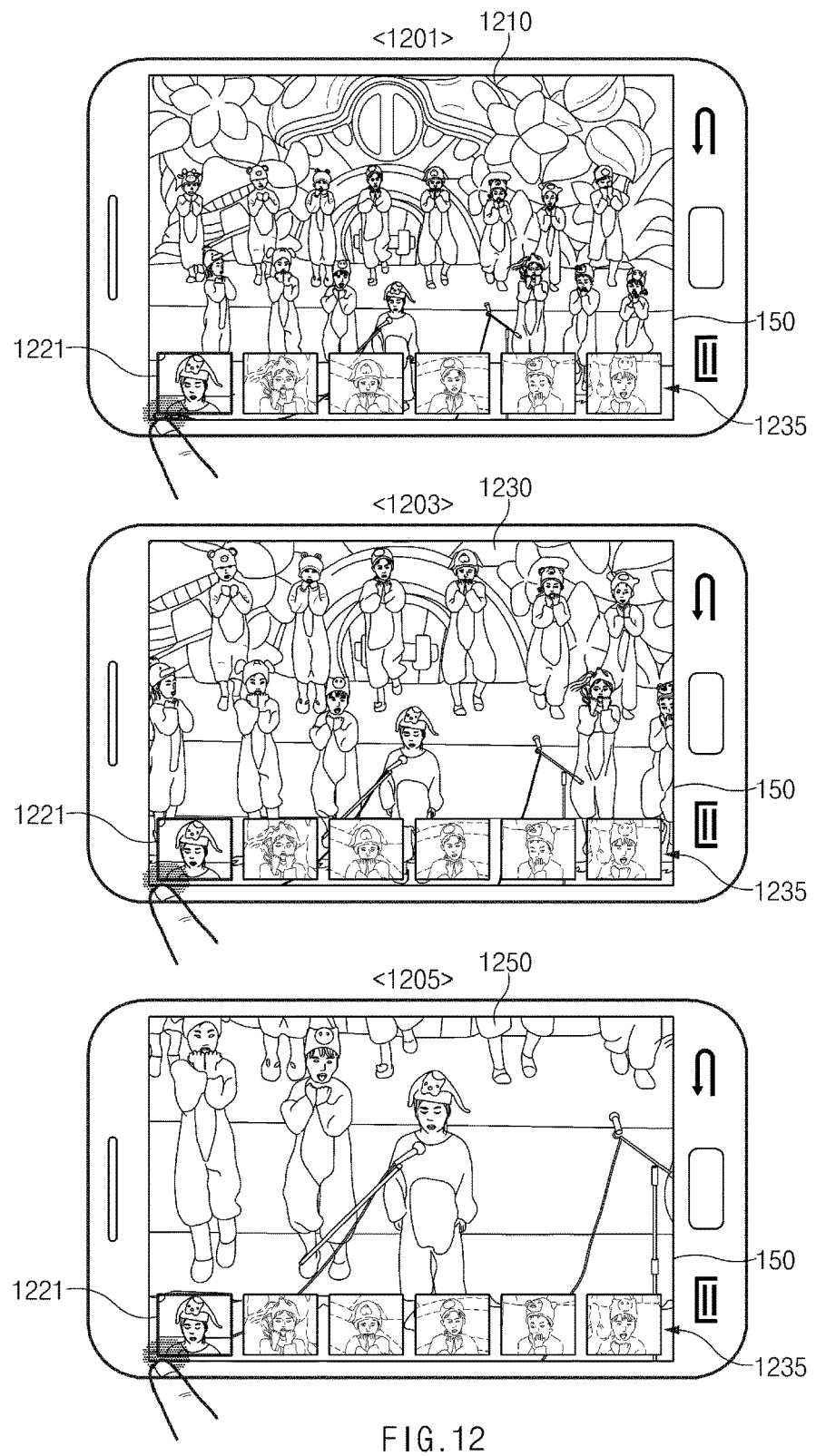
FIG. 12 is a diagram illustrating composition selection guide usage, according to an embodiment of the present invention.

FIG. 12 is a diagram illustrating composition selection guide usage, according to an embodiment of the present invention.

Referring to FIG. 12, the image processing module 170 outputs an image 1210 to the display 150, as shown in screen 1201. For example, the image processing module 170 may output the image acquired by the image collection module 180 to the display 150. The image processing module 170 outputs a composition selection guide 1235 to a side of a screen automatically corresponding to the output of the image 1210, or corresponding to the occurrence of an input event. The composition selection guide 1235 includes at least one composition item. The at least one composition item includes information relating to at least one object in the image 1210.

The image processing module 170 processes an input event relating to a composition item 1221. For example, the image processing module 170 controls the image collection module 180 with respect to an object (e.g., an object disposed at the center of a screen) corresponding to the composition item 1221, when an event of touching the composition item 1221 occurs. According to an embodiment of the present invention, the image processing module 170 controls the image collection module 180 so that a zoom function is centered around the object corresponding to the composition item 1221, when a touch event (e.g., a long touch event) relating to the composition item 1221 occurs. Thus, the image processing module 170 outputs an image 1230 to which a zoom function relating to the composition item 1221 is applied, as shown in screen 1203. The image processing module 170 applies a zoom function of enlarging a predetermined portion of the image 1210. Alternatively, the image processing module 170 may change the image capture condition of the image collection module 180 (e.g., change the zoom function of a lens) to acquire an image of a predetermined region centered around an object corresponding to the composition item 1221.

According to an embodiment of the present invention, the image processing module 170 acquires an image 1250 to which a zoom function is further applied and outputs the image to the display 150, as shown in screen 1205, when a touch event relating to the composition item 1221 continues. As described above, the image processing module 170 applies a zoom function centered around an object relating to a corresponding composition item 1221 (e.g., increase a zoom enlargement ratio or zoom reduction ratio), when a lasting touch event (e.g., a touch down event) relating to the composition item 1221 occurs. When a touch release event occurs, the image processing module 170 may output, to the display 150, an image to which magnification of zoom at a corresponding time is applied. Alternatively, the image processing module 170 may return to an initial state, e.g., screen 1201, when the touch release event occurs. According to an embodiment of the present invention, the magnification of zoom of the electronic device 100 may be limited to a size that is less than or equal to a predetermined value. Thus, even though an event of touching the composition item 1221 continues to occur, an image enlarged or reduced to a predetermined magnification may be output to the display 150.

As described above, a press-and-hold event on the composition item 1221 relating to applying a zoom function is described, but embodiments are not limited thereto. For example, when a pinch zoom event relating to the composition item 1221 occurs, the image processing module 170 may apply the magnification of zoom of an image differently according to a pinched distance. Also, the image processing module 170 may process the zoom enlargement or reduction ratio of an image differently according to at least one of a distance, speed, or direction dragged after the selection of the composition item 1221.

Figure 13:
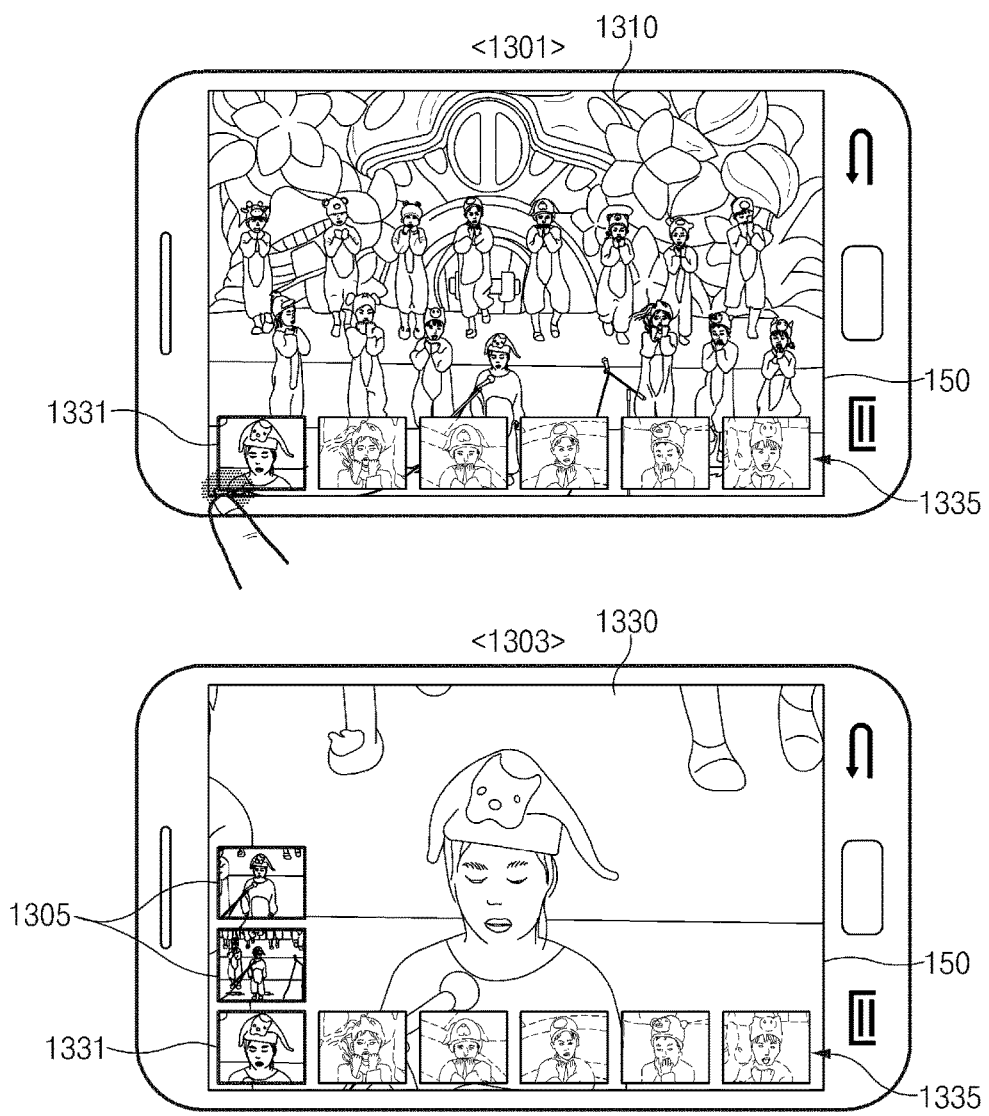
FIG. 13 is a diagram illustrating a composition selection guide expansion, according to an embodiment of the present invention.

FIG. 13 is a diagram illustrating a composition selection guide expansion, according to an embodiment of the present invention.

Referring to FIG. 13, the image processing module 170 outputs an image 1310 to the display 150, as shown in screen 1301. For example, the image processing module 170 may output the image 1310 acquired by the image collection module 180 to the display 150. The image processing module 170 outputs a composition selection guide 1335 relating to the image 1310 to a side of a screen. For example, the composition selection guide 1335 includes at least one composition item relating to at least one object in the image 1310.

According to an embodiment of the present invention, the image processing module 170 outputs a composition selection sub guide 1305, as shown in screen 1303, corresponding to the occurrence of a touch event of selecting a composition item 1331, for example. The composition selection sub guide 1305 may have sub composition items that include at least another piece of composition information relating to the composition item 1331. For example, the composition selection sub guide 1305 may include sub composition items to which a predetermined magnification of zoom relating to the composition item 1331 is applied. More particularly, the composition selection sub guide 1305 includes a sub composition item enlarging a predetermined region including a face relating to the composition item 1331, a sub composition item enlarging a predetermined region including a whole body relating to the composition item 1331, etc.

According to an embodiment of the present invention, the image processing module 170 outputs an image 1330, as shown in screen 1303, corresponding to selecting the composition item 1331. In addition, the image processing module 170 outputs the composition selection sub guide 1305 for selection of another composition relating to the composition item 1331. Alternatively, the image processing module 170 may output the composition selection sub guide corresponding to the occurrence of a gesture event (or a hovering event) relating to the composition item 1331. The image processing module 170 may also acquire the image 1330 to output it to the display 150, when the composition selection sub guide 1305 is output and the composition item 1331 is selected.

As described above, the image processing module 170 may process an applied function differently corresponding to the type or format of a touch event relating to the composition item 1331. For example, the image processing module 170 may apply an object based zoom function as described in FIG. 12, when a press-and-hold event occurs at the composition item 1331. Alternatively, the image processing module 170 may output the above composition selection sub guide 1305, when a multi-tap touch event relating to the composition item 1331 (e.g., an event of touching the composition item 1331 several times within a specific time) occurs. Alternatively, the image processing module 170 may apply a zoom function or output the composition selection sub guide 1305 corresponding to the occurrence of a touch gesture event (or a hovering event).

Figure 14:
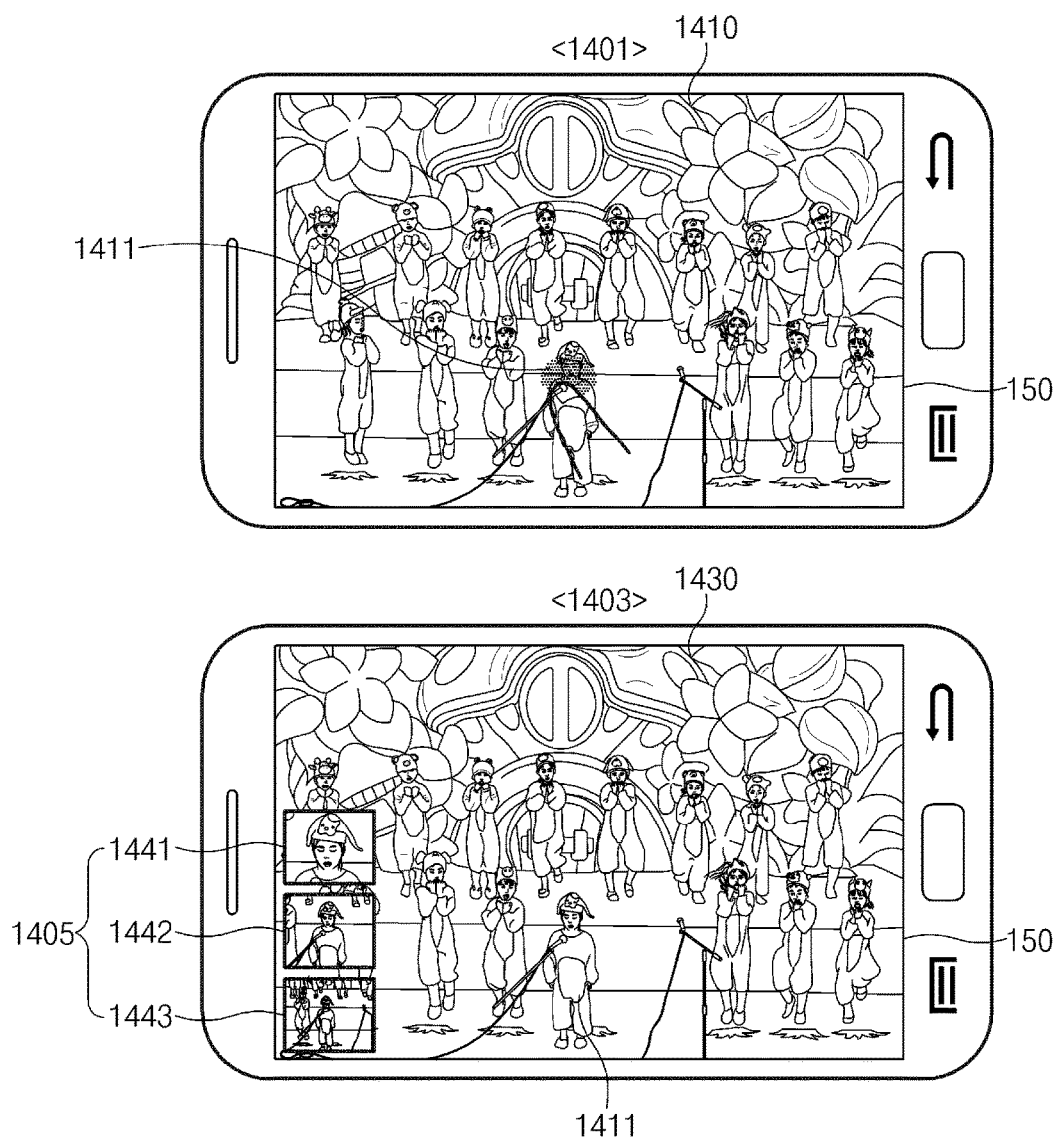
FIG. 14 is a diagram illustrating a composition selection sub-guide, according to an embodiment of the present invention.

FIG. 14 is a diagram illustrating a composition selection sub-guide, according to an embodiment of the present invention.

Referring to FIG. 14, the image processing module 170 outputs an image 1410 to the display 150, as shown in screen 1401. For example, the image processing module 170 may output the image 1410 acquired by the image collection module 180 to the display 150. The image processing module 170 detects an object 1411 in the image 1410, automatically or according to a setting. The image processing module 170 may use an image recognition DB stored in the memory 130 to detect a specific object (e.g., a person or face).

When the object 1411 in the image 1410 is recognized and an event of selecting the object 1411 (e.g., a touch event or hovering event) occurs, the image processing module 170 recognizes the selection of the object 1411 according to the occurrence of an event. The image processing module 170 outputs an image 1430 that includes a composition selection sub guide 1405, as shown in screen 1403, corresponding to the selection of the object 1411. The composition selection sub guide 1405 includes composition items 1441-1443 relating to the object 1411. For example, the composition selection sub guide 1405 includes composition items 1441 and 1442 for enlarging at least a portion of the object 1411 (e.g., a face or upper body), and a composition item 1443 including the entire region of the object 1411.

Figure 15A:
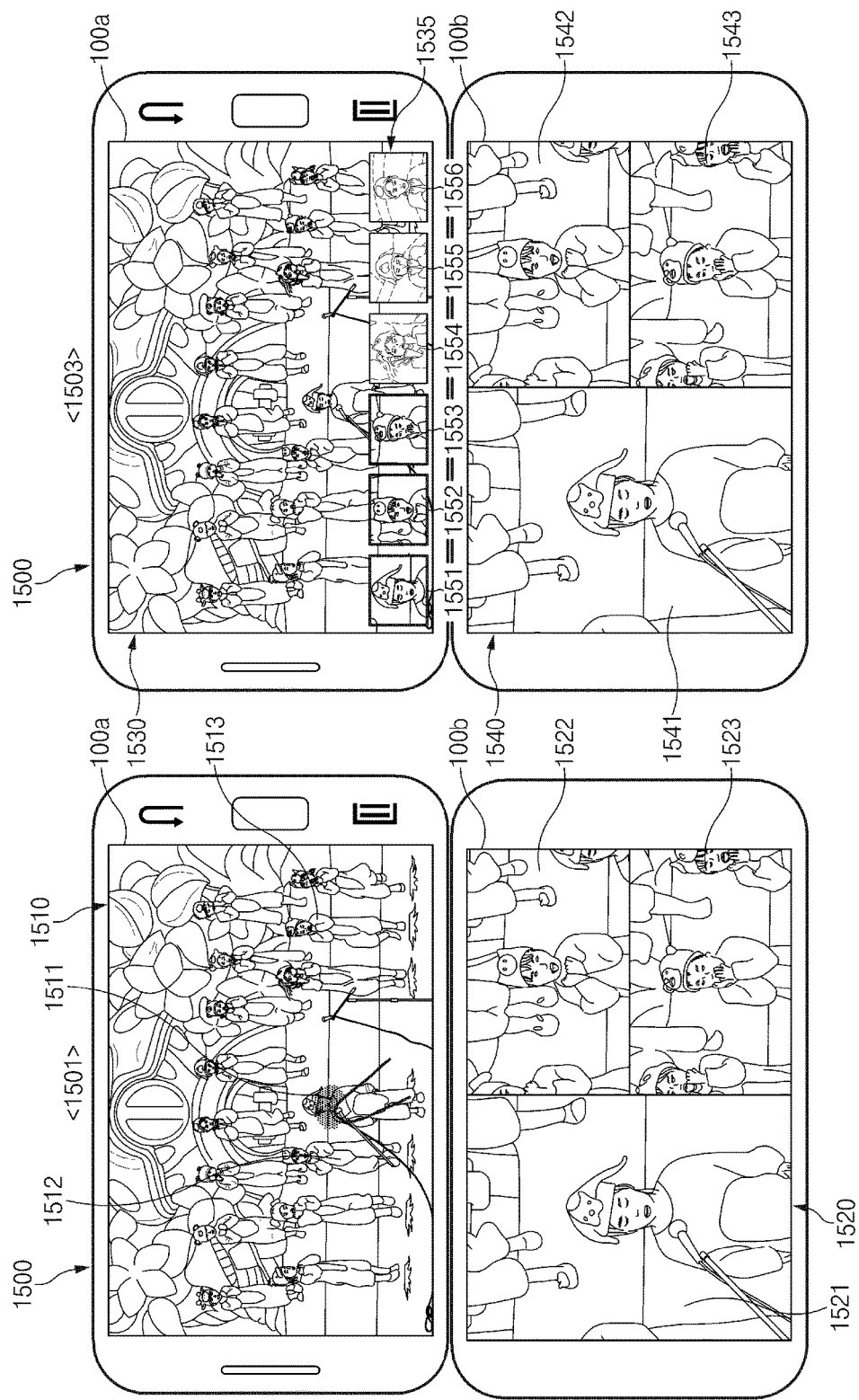
FIG. 15A is a diagram illustrating a composition selection guide usage of a dual display, according to an embodiment of the present invention.

FIG. 15A is a diagram illustrating composition selection guide usage of a dual display, according to an embodiment of the present invention.

Referring to FIG. 15A, an electronic device 1500 includes a display 100a and a display 100b. Additionally or alternatively, the electronic device 1500 may be electrically connected to the display 100a and the display 100b to output an image. The image processing module 170 may output a specific image to the display 100a or 100b.

According to an embodiment of the present invention, the image processing module 170 outputs an image 1510 to the display 100a, as shown in state 1501. The image processing module 170 may recognize at least one object in the image 1510 that has been output to the display 100a. The image processing module 170 may recognize an event of selecting a plurality of objects in the image 1510. For example, the image processing module 170 recognizes selection of objects 1511-1513 (e.g., a touch event or hovering event).

The image processing module 170 collects composition images corresponding to the selected objects 1511-1513, when the objects 1511-1513 are selected. The composition image corresponds to a predetermined region including the selected objects in the image 1510. The image processing module 170 outputs, to the display 100b, an image 1520 including composition images corresponding to respective objects 1511-1513. The image 1520 includes composition images 1521-1523, corresponding to the objects 1511-1513. The image processing module 170 splits the display 100b and positions the composition images 1521-1523 on split regions. The image processing module 170 may split a screen equally or unequally. When being split unequally, the image processing module 170 may dispose a composition image on a split region, according to an object selection order. According to an embodiment of the present invention, the image processing module 170 processes a request for a location change of each composition image in the image 1520. For example, the image processing module 170 may move the composition image 1521 to the position of the composition image 1522 corresponding to an event of moving the composition image 1521 to a place where there is the composition image 1522 (e.g., a touch drag event after a touch event of selecting the composition image 1521 occurs). The image processing module 170 may adjust the size of the composition image 1521 to the size of the composition image 1522. Also, the image processing module 170 may adjust the size of the composition image 1522 to the size of the previous composition image 1521.

According to an embodiment of the present invention, the compositions of the composition images 1521-1523 may be adjusted according to a user setting. For example, when the objects 1511-1513 are selected, the image processing module 170 may acquire composition images corresponding to predetermined regions that include the whole bodies of the objects 1511-1513. Alternatively, the image processing module 170 may also acquire composition images corresponding to predetermined regions that include the face regions of the objects 1511-1513.

According to an embodiment of the present invention, the image processing module 170 outputs a composition selection guide 1535 to a side of a screen, as shown in state 1503, and outputs an image 1530 to the display 100a. The image processing module 170 recognizes at least one object in the image 1530 and generates the composition selection guide 1535 that includes composition items relating to the recognized objects. When composition items 1551-1553 are selected from composition items 1551-1556 of the composition selection guide 1535, the image processing module 170 acquires a composition image that includes predetermined regions of objects corresponding to the selected composition items 1551-1553. For example, the image processing module 170 acquires composition images 1541-1543 corresponding to the composition items 1551-1553. The image processing module 170 outputs, to the display 100b, an image 1540 including the composition images 1541-1543. The output location or order of the composition images 1541-1543 may be adjusted according to the selection order of composition items. The location change of the composition images 1541-1543 may be performed according to an input event.

Figure 15B:
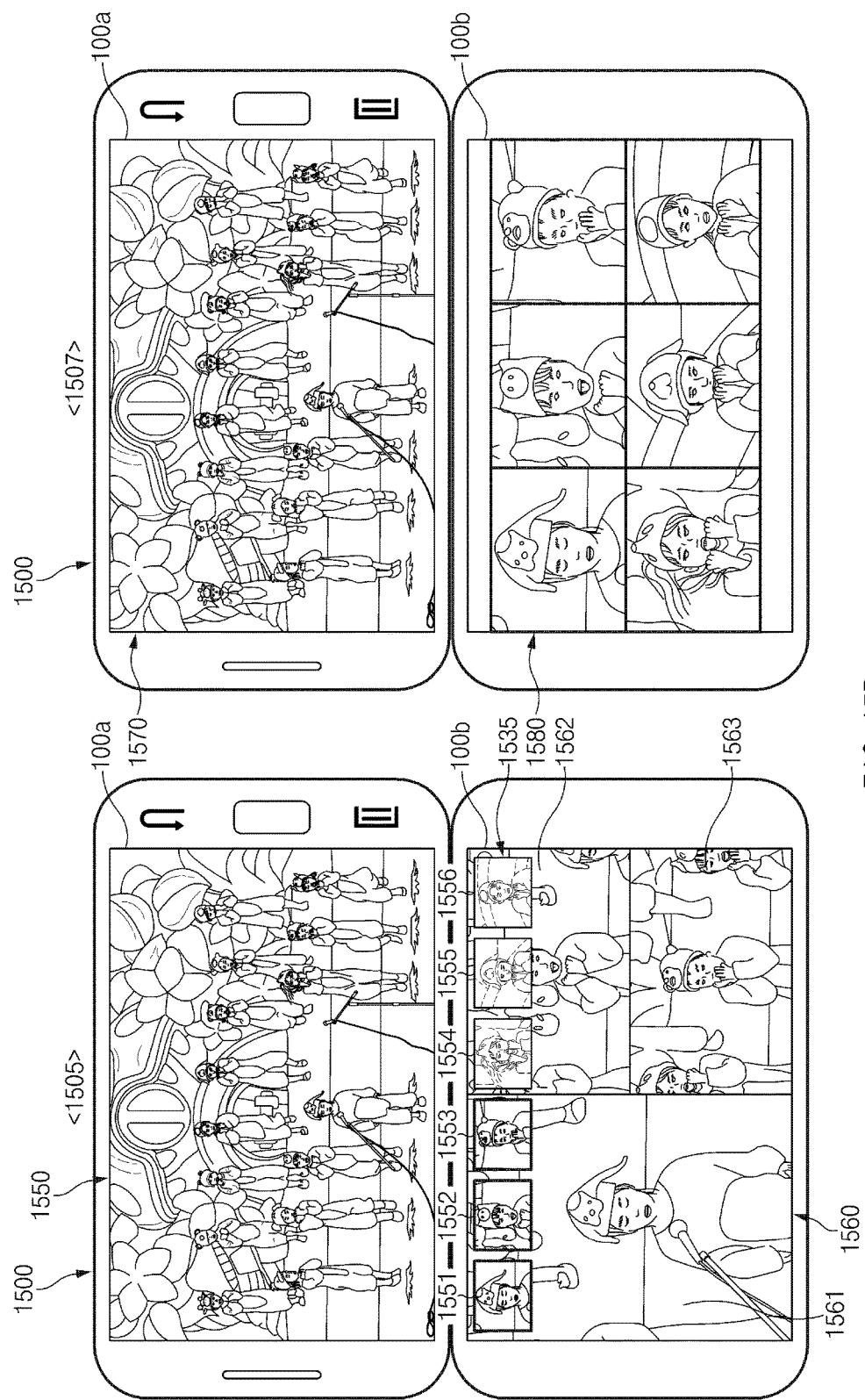
FIG. 15B is a diagram illustrating a composition selection guide usage of a dual display, according to an embodiment of the present invention.

FIG. 15B is a diagram illustrating composition selection guide usage of a dual display, according to an embodiment of the present invention.

Referring to FIG. 15B, the electronic device 1500 includes the display 100a and the display 100b. The displays 100a and 100b may be functionally connected to each other. The image processing module 170 outputs an image 1550 to the display 100a, as shown in screen 1505. For example, the image processing module 170 may output, to the display 100a, the image 1550 acquired by the image collection module in the electronic device 1500. The image processing module 170 recognizes at least one object in the image 1550.

The image processing module 170 outputs, to the display 100b, the composition selection guide 1535 including at least one composition item, e.g., composition items 1551-1556 according to object recognition. When an composition items, e.g., composition items 1551 to 1553, are selected from the composition selection guide 1535, the image processing module 170 acquires composition images 1561-1563 corresponding to corresponding composition items 1551-1553. The image processing module 170 outputs, to the display 100b, an image 1560 including composition images 1561-1563. The image processing module 170 may overlay a predetermined region of the image 1560 with the composition selection guide 1535, and output the composition selection guide 1535. According to an embodiment of the present invention, the image processing module 170 may remove the composition selection guide 1535 from the display 100b after a predetermined time elapses. Alternatively, the image processing module 170 may output the composition selection guide 1535 until a separate removal event occurs.

According to an embodiment of the present invention, the image processing module 170 outputs an image 1570 to the display 100a, as shown in screen 1507. The image processing module 170 recognizes objects in the image 1570 and selects at least one of the recognized objects, automatically or according to an input event, to output the selected object to the display 100b. For example, the image processing module 170 acquires composition images corresponding to a predetermined number of objects among objects in the image 1570, and outputs an image including the acquired composition images to the display 100b. The object selected from among the objects in the image 1570 may be adjusted according to a user selection or a specific setting. The image processing module 170 equally splits the screen of the display 100*b*, and displays a composition image 1580, including composition images, on equally spit regions.

According to an embodiment of the present invention, the image processing module 170 adjusts the composition of a collected composition image, according to the number of composition images to be collected. For example, when the display 100*b* is split into two regions, according to the selection of two objects or according to the selection of two composition items, the image processing module 170 acquires composition images having a predetermined region of selected objects (e.g., the whole body of a person). When the display 100*b* is split into four regions, according to the selection of four objects or according to the selection of four composition items, the image processing module 170 acquires composition images including a partial region of an object (e.g., the upper body of the object). When the display 100*b* is split into six regions, according to the selection of six objects or according to the selection of six composition items, the image processing module 170 acquires composition images of predetermined sizes including a partial region of selected objects (e.g., a face region).

Figure 16:
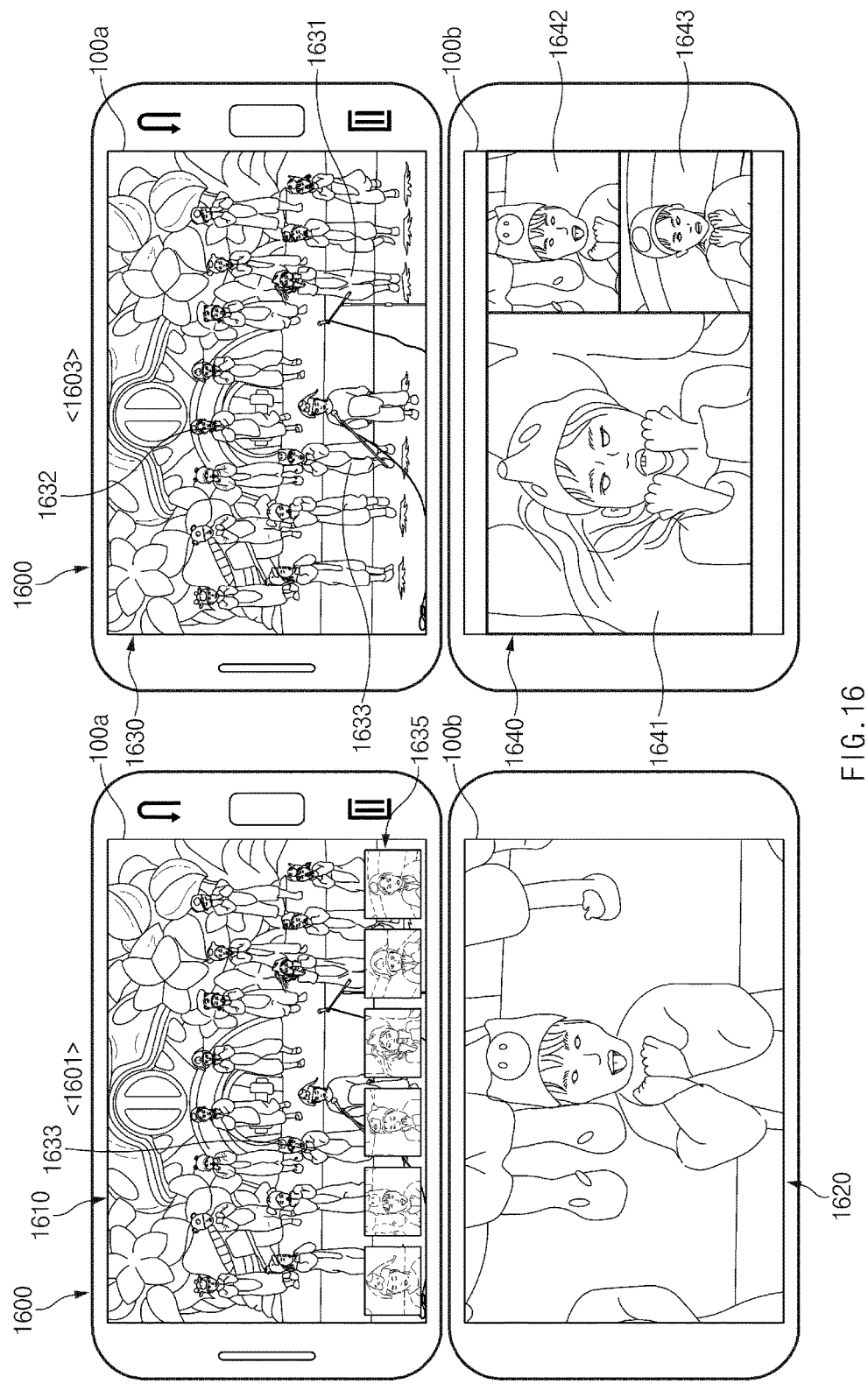
FIG. 16 is a diagram illustrating a composition selection guide usage of a dual display, according to an embodiment of the present invention.

FIG. 16 is a diagram illustrating composition selection guide usage of a dual display, according to an embodiment of the present invention.

Referring to FIG. 16, an electronic device 1600 includes the display 100*a* and the display 100*b*. The image processing module 170 outputs, to the display 100*a*, an image 1610 acquired by the image collection module in the electronic device 1600, as shown in state 1601. The image processing module 170 outputs, to the display 100*a*, a composition selection guide 1635 relating to at least one object in the image 1610. The image processing module 170 also collects a composition image corresponding to an object 1633, when the object 1633 is selected (e.g., by a touch event or hovering event). According to an embodiment of the present invention, the image processing module 170 acquires a predetermined image including the upper body of the object 1633, as a composition image. Specifically, the image processing module 170 adjusts the image capture condition of the image collection module 180 to acquire the composition image of the object 1633. Alternatively, the image processing module 170 extracts a predetermined region including the object 1633, from the acquired image. The image processing module 170 may also enlarge the extracted predetermined region to generate the composition image. The image processing module 170 outputs an acquired image 1620 to the display 100*b*.

According to an embodiment of the present invention, the image processing module 170 outputs an image 1630 to the display 100*a*, as shown in state 1603. The image processing module 170 recognizes at least one object in the image 1630. The image processing module 170 may receive an event selecting objects, e.g., objects 1631-1633, in the image 1630. The image processing module 170 collects composition images 1641-1643 that correspond to selected objects 1631-1633. The image processing module 170 outputs, to the display 100*b*, an image 1640 including the collected composition images 1641-1643. The image processing module 170 determines the positions of the composition images on the display 100*b*, corresponding to an object selection order.

When the electronic device 1600 includes a plurality of camera modules, the image processing module 170 may use the plurality of camera modules in the acquisition of the composition images 1641-1643. For example, the image processing module 170 may control at least one of the angle of view or zoom function of a first camera module among the plurality of camera modules to acquire the composition image 1641. Also, the image processing module 170 may use a second camera module among the plurality of camera modules to acquire the composition image 1642, and use a third camera module among the plurality of camera modules to acquire the composition image 1643.

According to an embodiment of the present invention, the image processing module 170 may process a composition image corresponding to the composition item selected in the composition selection guide 1635 in a different manner from the image 1610. For example, the image processing module 170 may make the frame rate of the image 1610 different from the frame rate of the composition image 1620 (e.g., the frame rate of the image 1610 may be lower or higher than the frame rate of the composition image 1620). The image processing module 170 may store the image 1610 and the composition image 1620 having different frame rates separately in the memory or integrate them to store one image in the memory. According to an embodiment of the present invention, the image processing module 170 may process at least one of the resolution or size of the image 1630 to be different from at least one of the resolution or size of the composition image 1640. According to an embodiment of the present invention, the image processing module 170 may process the composition images 1641-1643 in the composition image so that at least one of the frame rate, size, or resolution thereof is different from one another. Through the above processing, the image processing module 170 may reduce a load for processing an acquired image and efficiently use a memory storage space.

Figure 17:
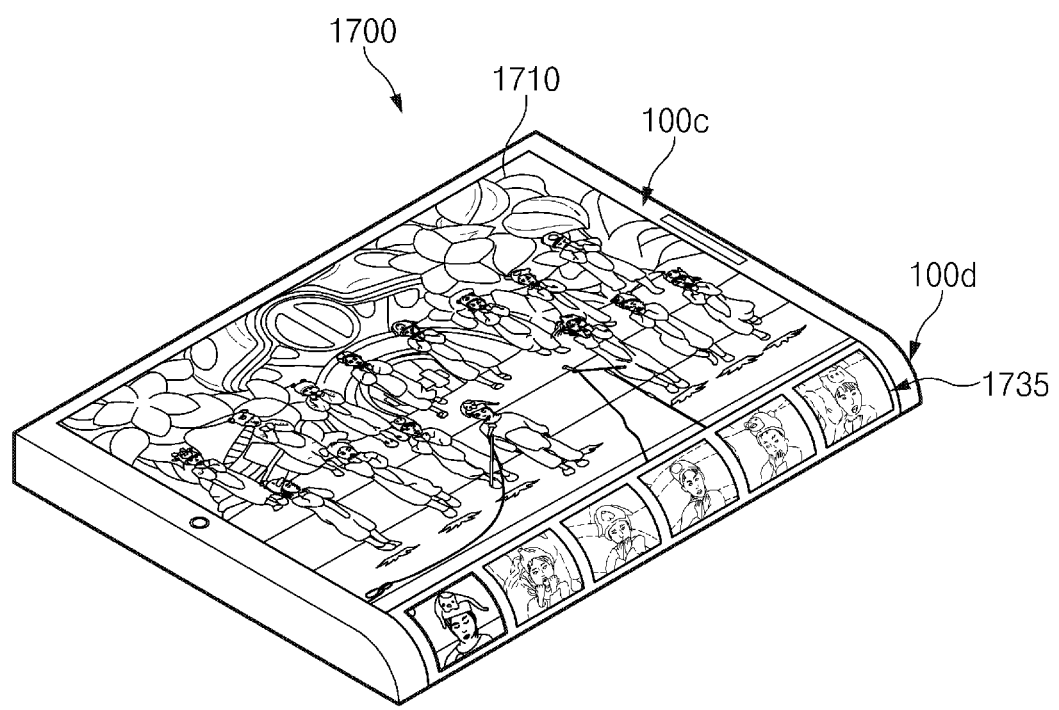
FIG. 17 is a diagram illustrating a composition selection guide provision of an electronic device, according to an embodiment of the present invention.

FIG. 17 is a diagram illustrating composition selection guide provision of an electronic device, according to an embodiment of the present invention.

Referring to FIG. 17, an electronic device 1700 includes a display 100*c* having a flat surface and a display 100*d* having a curved surface. The display 100*c* and the display 100*d* may be disposed so that a side of the former is coupled to a side of the latter. Alternatively, an edge of the display 100*c* and an edge of the display 100*d* may be coupled to each other. Alternatively, the display 100*c* and the display 100*d* may be implemented in a single display, which is configured to have a flat display region 100*c* and a curved display region 100*d*. The image processing module 170 may be disposed inside the casing of the electronic device 1700 to control screens to be displayed on the displays 100*c* and 100*d*.

According to an embodiment of the present invention, the image processing module 170 controls the usage of the image collection module in the electronic device 1700. For example, the image processing module 170 outputs an image 1710 acquired by the image collection module to the display 100*c*. The image processing module 170 recognizes at least one object in the image 1710. The image processing module 170 outputs, to the display 100*d*, a composition selection guide 1735 that includes at least one composition item based on the at least one object recognized in the image 1710. The image processing module 170 may display the composition item at a specific predetermined size. The image processing module 170 may dispose a predetermined number of composition items of predetermined sizes on the display 100*d* region. The image processing module 170 may not display at least some of composition items relating to the recognized objects, on the display 100*d* region. The image processing module 170 may change composition items in the composition selection guide 1735 corresponding to an event of requesting to display the composition item that is not shown (e.g., a touch event that occurs on the display 100d region). According to an embodiment of the present invention, the image processing module 170 may preferentially display, on the display 100d, composition items relating to objects of specific predetermined regions. For example, the image processing module 170 may include, composition items relating to objects disposed within predetermined regions centered around the center of the image 1710, in the composition selection guide 1735, and display them on the display 100d.

When a specific composition item in the composition selection guide 1735 displayed on the display 100d is selected, the image processing module 170 may acquire a composition image corresponding to the selected composition item. The image processing module 170 may dispose the acquired composition image on at least one of the display 100c or 100d. For example, the image processing module 170 may output the acquired composition image to the display 100c and maintain the composition selection guide 1735 on the display 100d. The image processing module 170 may output, to the display 100c, an image including a plurality of objects according to the selection of a plurality of composition items, or may output composition images corresponding to each of the plurality of composition items, to the split screen of the display 100c.

Figure 18:
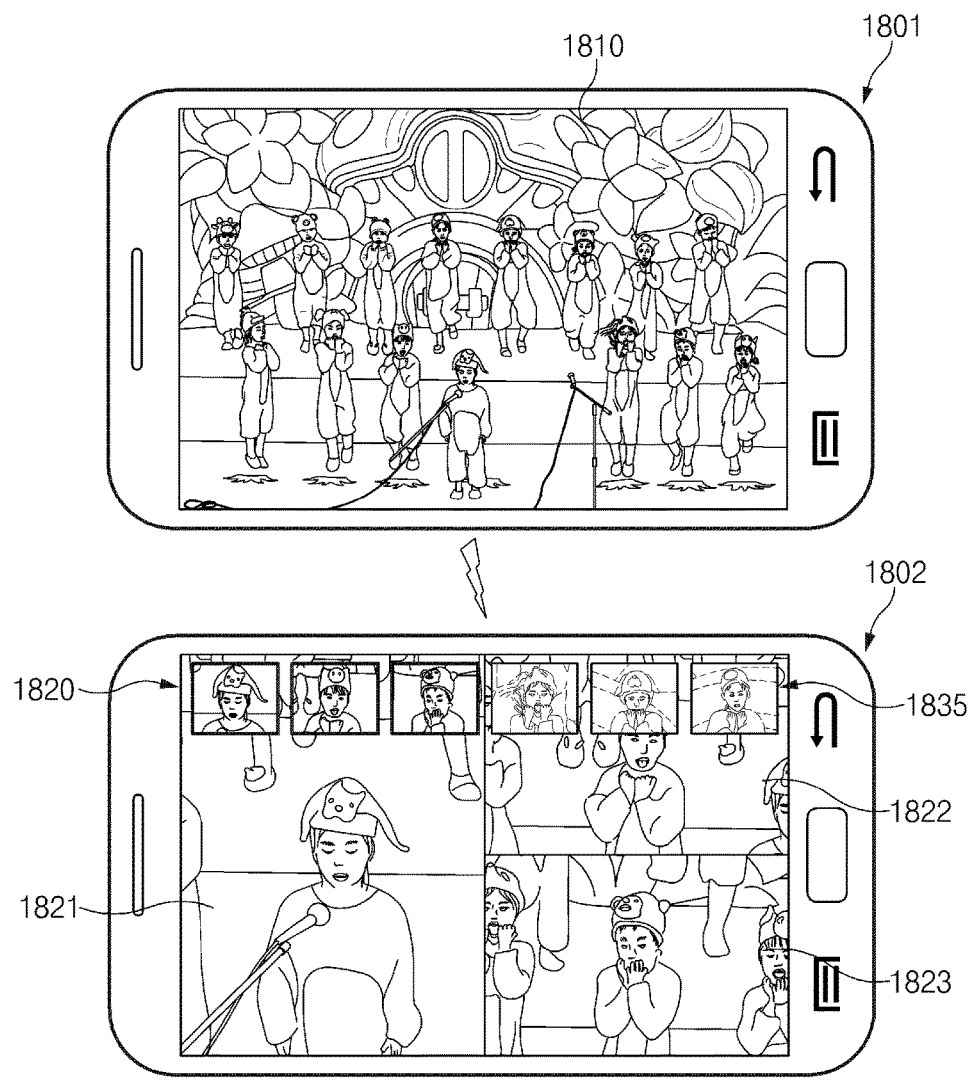
FIG. 18 is a diagram illustrating a composition selection guide provision of an electronic device, according to an embodiment of the present invention.

FIG. 18 is a diagram illustrating composition selection guide provision of an electronic device, according to an embodiment of the present invention.

Referring to FIG. 18, an electronic device 1800 includes a first device 1801 and a second device 1802. The first device 1801 and the second device 1802 may be electrically connected to each other or establish a communication channel. For example, image data of the first device 1801 may be relayed to the second device 1802.

According to an embodiment of the present invention, the device 1801 outputs an image 1810 to a display. The image 1810 may be data acquired based on the image collection module in the first device 1801, or data stored in the memory of the first device 1801. The image processing module in the first device 1801 detects at least one object in the image 1810 based on an image recognition DB that is stored in the memory. The image processing module generates a composition selection guide based on the at least one detected object. The image processing module of the first device 1801 transmits the composition selection guide to the second device 1802. Regarding this, the image processing module 170 may automatically scan surroundings to search for the second device 1802, when the image 1810 is collected. The image processing module 170 may establish a communication channel relating to composition selection guide transmission with a found device. When the communication channel is established, the image processing module 170 may transmit the composition selection guide to the second device 1802.

According to an embodiment of the present invention, the image processing module 170 may provide a menu relating to a composition selection guide usage. When the menu relating to the composition selection guide usage is selected, the image processing module 170 may search for a peripheral device and output a found peripheral device list to the first device 1801. The image processing module 170 may establish a communication channel with the second device 1802, when an electronic device, e.g., the second device 1802 is selected. The second device 1802 may output a check window relating to a communication channel establishment request from the first device 1801 and establish the communication channel corresponding to user control.

According to an embodiment of the present invention, the second device 1802 may automatically permit the establishment of the communication channel when there is a history relating to the establishment of the communication channel with the first device 1801 or when there is previously registered information.

The second device 1802 outputs a composition selection guide to a side of a screen. The second device 1802 outputs an image 1820 that includes images relating to composition items selected in the composition selection guide, e.g., composition images 1821-1823. The second device 1802 may transmit, to the first device 1801, an event of selecting at least one composition item (e.g., composition items corresponding to objects relating to composition images 1821-1823).

The first device 1801 acquires a predetermined region relating to objects corresponding to the selected composition items, when composition item selection information is received from the second device 1802. For example, the image processing module of the device 1801 may adjust at least one of the angle of view or zoom function of the image collection module so that the image collection module acquires a predetermined region of an object corresponding to a selection composition item. The first device 1801 transmits the acquired composition images to the second device 1802. According to an embodiment of the present invention, the first device 1801 transmits each of the composition images 1821-1823 to the second device 1802. Alternatively, the first device 1801 may transmit the image 1820 including the composition images 1821-1823 to the second device 1802.

When the composition images 1821-1823 are received from the first device 1801, the second device 1802 generates the image 1820 based on the received images to output the generated image to a display. Alternatively, the second device 1802 may output a received image to the display, when the image 1820 is received from the first device 1801. The second device 1802 may place the composition images 1821-1823 at predetermined positions on a split screen. The second device 1802 may control a location change of the composition images 1821-1823 corresponding to an input event.

Figure 19:
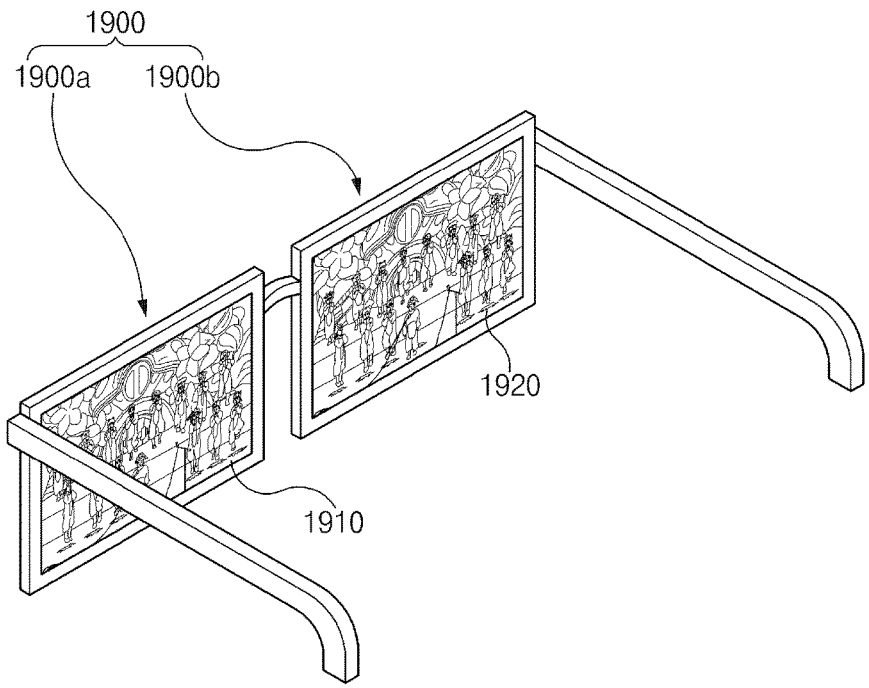
FIG. 19 is a diagram illustrating a composition selection guide provision of an electronic device, according to an embodiment of the present invention.
Figure 19:
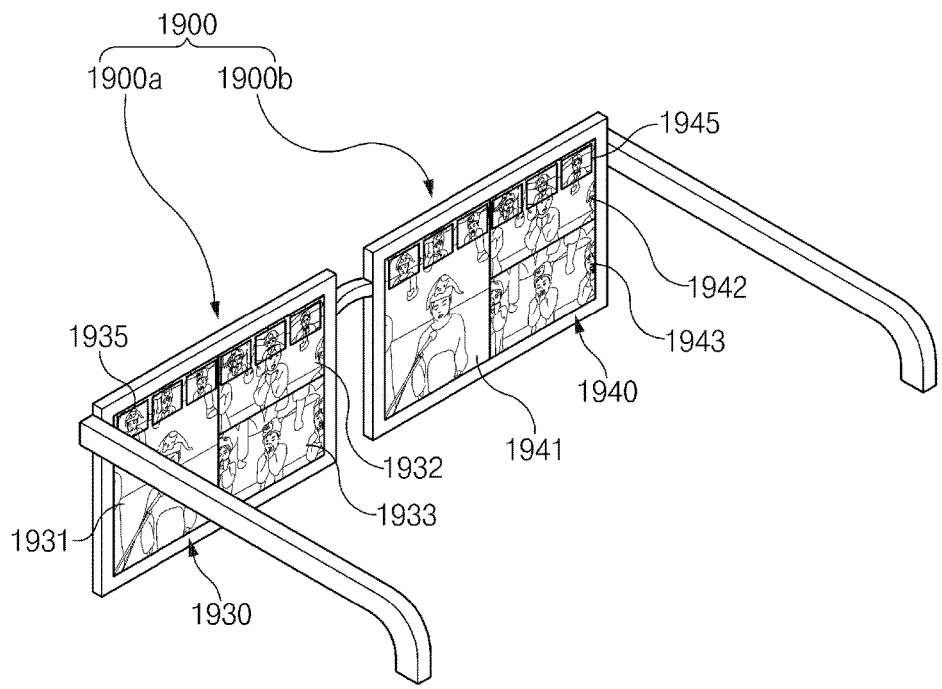

FIG. 19 is a diagram illustrating composition selection guide provision of an electronic device, according to an embodiment of the present invention.

Referring to FIG. 19, an electronic device 1900 includes a left-eye display 1900a and a right-eye display 1900b. As shown in state 1901, an image 1910, collected by an image collection module in the electronic device 1900, is displayed on the left-eye display 1900a. An image 1920, collected by the image collection module in the electronic device 1900, is displayed on the right-eye display 1900b. The electronic device 1900 may include the image collection module that has a plurality of camera modules. For example, the electronic device 1900 may include a first camera collecting an image relating to the left-eye display 1900a and a second camera collecting an image relating to the right-eye display 1900b. According to an embodiment of the present invention, the electronic device 1900 may also include an image collection module having a single camera module. In this case, images collected by the image collection module may be displayed on the left-eye display 1900a and the right-eye display 1900b, respectively.

According to an embodiment of the present invention, the electronic device 1900 may include an input device (a key button, touch key, and so on) that generates an input event relating to a call for a composition selection guide. According to an embodiment of the present invention, the electronic device 1900 may include a camera module that is disposed where it is possible to capture an image of a wearer's eye region. The electronic device 1900 may capture an image of the wearer's eye region to collect change information on the eye region. The electronic device 1900 may include an image processing module relating to image displays of the left-eye display 1900a and the right-eye display 1900b.

When a change in eye region is collected, an image display module may compare it with specific information. The image display module may control a change in image on at least one of the left-eye display 1900a and the right-eye display 1900b corresponding to a specific eye region change. For example, the image display module may detect a specific eye change (e.g., a change that at least one of the left eye and the right eye becomes a specific state for a specific time (e.g., a change that an eye is closed for a specific time, or a change that eyes blink a specific number of times or more within a specific time)). The image display module may output a composition selection guide 1935 to the left-eye display 1900a, as shown in state 1903, when a specific eye change occurs. Alternatively, the image display module may output a composition selection guide 1945 to the right-eye display 1900b, when a specific eye change occurs.

An image output module may acquire a composition image corresponding to a selected composition item when at least one composition item in at least one of the composition selection guides 1935 and 1945 is selected. According to an embodiment of the present invention, the image output module may track the line of sight of an eye to recognize selection of a composition item in the composition selection guide 1935 or 1945. For example, when the line of sight stays at a composition item for a specific time, the image output module may determine that the composition item at which the line of sight has stayed is selected. Alternatively, the image output module may determine that a corresponding composition item is selected, when the wearer fixes his or her eyes on a composition item and a specific eye change occurs (e.g., he or she blinks a predetermined number of times).

The image output module may acquire composition items corresponding selected composition items and output acquired image to the left-eye display 1900a or the right-eye display 1900b. According to an embodiment of the present invention, the image output module may acquire composition images 1931-1933 corresponding to composition items selected in the composition selection guide 1935. Alternatively, the image output module may acquire composition images 1941-1943 corresponding to composition items selected in the composition selection guide 1945. The image output module may generate an image 1930 including the composition images 1931-1933 and output the image 1930 to the left-eye display 1900a. The image output module may generate an image 1940 including the composition images 1941-1943 and output the image 1940 to the right-eye display 1900b. The image output module may be built into the temples or rim that surrounds the left-eye display or the right-eye display.

Figure 20:
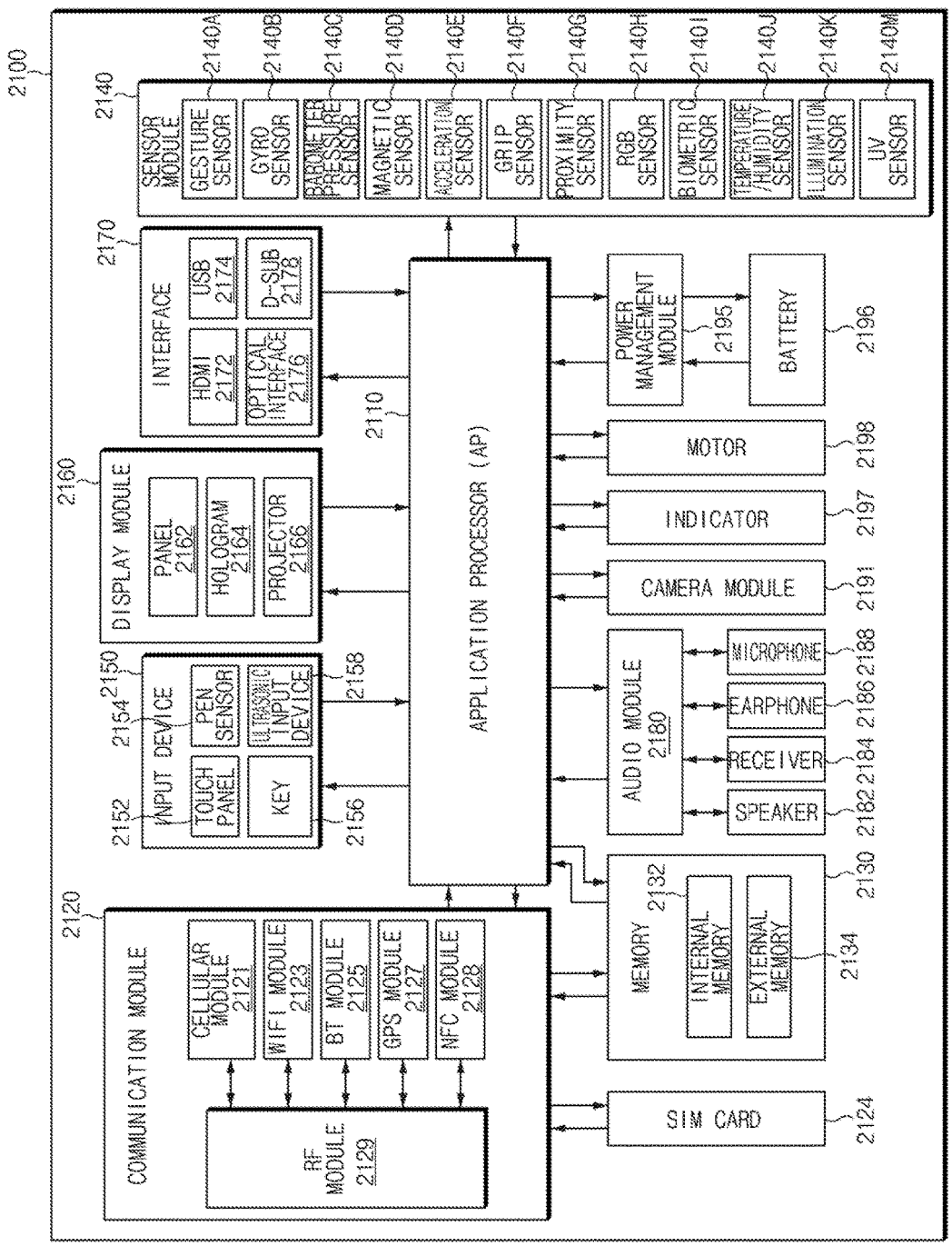
FIG. 20 is a block diagram illustrating an electronic device, according to an embodiment of the present invention.

FIG. 20 is a block diagram illustrating an electronic device, according to an embodiment of the present invention.

Referring to FIG. 20, an electronic device 2100 includes all or some of the electronic device 100 shown in FIG. 1, for example. Referring to FIG. 20, the electronic device 2100 includes one or more application processors (APs) 2110 (e.g., the processor 120 or the image processing module 170), a communication module 2120 (e.g., the communication interface 160), a subscriber identification module (SIM) card 2124, a memory 2130 (e.g., the memory 130), a sensor module 2140, an input device 2150 (e.g., the input and output interface), a display module 2160 (e.g., the display 150), an interface 2170, an audio module 2180 (e.g., the input and output interface 140), a camera module 2191, a power management module 2195, a battery 2196, an indicator 2197, and a motor 2198.

The AP 2110 may execute an operating system or application programs to control a plurality of hardware or software components connected to the AP 2110, and may perform processing and operations on various pieces of data including multimedia data. The AP 2110 may be implanted in a system on chip (SoC), for example. According to an embodiment of the present invention, the AP 2110 may further include a graphic processing unit (GPU).

The communication module 2120 (e.g., the communication module 160) may perform data transmission and reception when communication is performed between the electronic device 2100 (e.g., the electronic device 100) and other electronic devices (e.g., the external electronic device 102 or the server 106) connected through a network. According to an embodiment of the present invention, the communication module 2120 may transmit information relating to a composition selection guide (e.g., a text or image) to another electronic device, and receive information on a composition item selection from the other electronic device. Also, the communication module 2120 may transmit a collected composition image to the other electronic device corresponding to a selected composition item. According to an embodiment of the present invention, the communication module 2120 may include a cellular module 2121, a WiFi module 2123, a BT module 2125, a GPS module 2127, an NFC module 2128, and a radio frequency (RF) module 2129.

The cellular module 2121 may provide a voice call, a video call, a text message service, or an internet service through a communication network (such as an LTE, LTE-A, CDMA, WCDMA, UMTS, WiBro or GSM network). Also, the cellular module 2121 may use, for example, a subscriber identity module (such as the SIM card 2124) to perform the identification and authentication of an electronic device in a communication network. According to an embodiment of the present invention, the cellular module 2121 may perform at least some of functions that the AP 2110 may provide. For example, the cellular module 2121 may perform at least some of multimedia control functions.

According to an embodiment of the present invention, the cellular module 2121 may include a communication processor (CP). Also, the cellular module 2121 may be implemented in an SoC, for example. FIG. 20 shows components such as, for example, a cellular module 2121 (such as a communication processor), a memory 2130, and a power management module 2195 as being separate from the AP 2110, but according to an embodiment of the present invention, the AP 2110 may be implemented to include at least some of the above-described components.

According to an embodiment of the present invention, the AP 2110 or the cellular module 2121 (such as a communication processor) may load, on volatile memories, commands or data received from at least one of a non-volatile memory connected to thereto or another component, and may process the commands or data. Also, the AP 2110 or the cellular module 2121 may store, on non-volatile memories, data received from at least one of other components or generated by at least one of other components.

Each of the WiFi module 2123, the BT module 2125, the GPS module 2127 and the NFC module 2128 may include a processor for processing data transmitted and received through a corresponding module, for example. FIG. 20 shows each of the cellular module 2121, the WiFi module 2123, the BT module 2125, the GPS module 2127, and the NFC module 2128 as separate blocks, but according to an embodiment of the present invention, at least some (e.g., two or more) of the cellular module 2121, the WiFi module 2123, the BT module 2125, the GPS module 2127, and the NFC module 2128 may be included in one integrated chip (IC) or an IC package. For example, at least some (such as a communication processor corresponding to the cellular module 2121 and a WiFi processor corresponding to the WiFi module 2123) of the processors corresponding to the cellular module 2121, the WiFi module 2123, the BT module 2125, the GPS module 2127, and the NFC module 2128, may be implemented in one SoC.

The RF module 2129 may perform data transmission and reception, such as, for example, transmission and reception of an RF signal. The RF module 2129 may include, for example, a transceiver, a power amp module (PAM), a frequency filter, or a low noise amplifier (LNA. Also, the RF module 2129 may further include a part such as a conductor or wire for transmitting and receiving electromagnetic waves in a free space when performing wireless communication. Although FIG. 20 shows that the cellular module 2121, the WiFi module 2123, the BT module 2125, the GPS module 2127, and the NFC module 2128 share one RF module 2129, at least one of the cellular module 2121, the WiFi module 2123, the BT module 2125, the GPS module 2127, and the NFC module 2128 may also transmit and receive an RF signal through a separate RF module, according to an embodiment of the present invention.

The SIM card 2124 may include a SIM and may be inserted into a slot that is formed on a specific location on an electronic device. The SIM card 2124 may include unique identification information (such as, for example, an integrated circuit card identifier (ICCID)) or subscriber information (such as, for example, an international mobile subscriber identity (IMSI)).

The memory 2130 (e.g., the memory 130) includes at least one of an internal memory 2132 and an external memory 2134. The internal memory 2132 may include at least one of a volatile memory (such as, for example, a dynamic RAM (DRAM), a static RAM (SRAM), or a synchronous dynamic RAM (SDRAM)) and a non-volatile memory (such as, for example, a one time programmable ROM (OTPROM), a programmable ROM (PROM), an erasable and programmable ROM (EPROM), an electrically erasable and programmable ROM (EEPROM), a mask ROM, a flash ROM, a NAND flash memory, or a NOR flash memory). The memory 2130 may store data relating to image processing, e.g., a captured image or received image. The memory 2130 may store an image relating to a composition selection guide, an image to which the composition selection guide is applied, a captured image or received image to which a composition image is applied, etc.

According to an embodiment of the present invention, the internal memory 2132 may be a solid state drive (SSD). The external memory 2134 may further include a flash drive, such as, for example, a compact flash (CF) drive, a secure digital (SD) drive, a micro secure digital (micro-SD) drive, a mini secure digital (mini-SD) drive, or an extreme digital (xD) drive, or a memory stick. The external memory 2134 may be functionally connected to the electronic device 2100 through various interfaces. According to an embodiment of the present invention, the electronic device 2100 may further include a storage device (or storage medium) such as an HDD.

The sensor module 2140 may measure a physical quantity or sense the operation state of the electronic device 2100 to convert measured or sensed information into an electrical signal. The sensor module 2140 includes at least one of a gesture sensor 2140A, a gyro sensor 2140B, an atmospheric pressure sensor 2140C, a magnetic sensor 2140D, an acceleration sensor 2140E, a grip sensor 2140F, a proximity sensor 2140G, a color sensor 2140H (such as a red, green, blue (RGB) sensor), a bio sensor 2140I, a temperature/humidity sensor J, an illumination sensor 2140K, and a ultra violet (UV) sensor 2140M. Additionally or alternatively, the sensor module 2140 may include, for example, an E-nose sensor, an electromyography (EMG) sensor, an electroencephalogram (EEG) sensor, an electrocardiogram (ECG) sensor, an infrared (IR) sensor, an iris sensor or a fingerprint sensor. The sensor module 2140 may further include a control circuit for controlling at least one sensor that is included in the sensor module 2140.

The input device 2150 includes at least one of a touch panel 2152, a (digital) pen sensor 2154, a key 2156, and an ultrasonic input device 2158. The touch panel 2152 may recognize a touch input by using at least one selected from the group consisting of a capacitive, pressure-sensitive, infrared and ultrasonic techniques, for example. The touch panel 2152 may also include a control circuit. In the case of the capacitive technique, physical contact or proximity awareness is possible. The touch panel 2152 may further include a tactile layer. In this case, the touch panel 2152 may provide a user with a tactile response.

The (digital) pen sensor 2154 may be implemented by using a method that is the same as or similar to that of obtaining a user's touch input, or by using a separate sheet for recognition, for example. The key 2156 may include, for example, a physical button, an optical key, and/or a keypad. The ultrasonic input device 2158 may sense a sound wave with a microphone (e.g., a microphone 2188) from the electronic device 2100 and check data, through an input tool generating an ultrasonic signal, and may thus perform wireless recognition. According to an embodiment of the present invention, the electronic device 2100 may also use the communication module 2120 to receive a user input from an external device (such as a computer or server) connected thereto.

According to an embodiment of the present invention, the input device 2150 may generate an input signal relating to the control of an image collection module, an input signal relating to the reception of an image, an input signal relating to a call for a composition selection guide, an input signal relating to a composition item selection, an input signal relating to a sub composition item selection, an input signal relating to an object selection, an input signal relating to the location change or size change of a composition image, etc. The input signal generated by the input device 2150 may be an event such as a touch event, a hovering event, or a key button selection event.

The display module 2160 (such as a display 150) includes at least one of a panel 2162, a hologram device 2164, and a projector 2166. The panel 2162 may be a liquid-crystal display (LCD) or an active-matrix organic light-emitting diode (AM-OLED), for example. The panel 2162 may be implemented flexibly, transparently, or wearably, for example. The panel 2162 may also be integrated into the touch panel 2152 so that they are implemented in one module. The hologram device 2164 may use the interference of light to show a stereoscopic image in the air. The projector 2166 may project light onto a screen to display an image. The screen may be located internal or external to the electronic device 2100, for example. According to an embodiment of the present invention, the display 2160 may further include a control circuit for controlling the panel 2162, the hologram device 2164 or the projector 2166. The display module 2160 may also be provided in plurality, according to the characteristic of an electronic device. As described in various embodiments, the display module 2160 may include a single display, a plurality of neighboring displays, or a plurality of displays connected by a wireless communication channel on which an image, a composition selection guide, and a region displaying a composition image are displayed.

The interface 2170 includes at least one of an HDMI 2172, a universal serial bus (USB) 2174, an optical interface 2176, and a D-subminiature (D-Sub) 2178. The interface 2170 may be included in the communication interface 160 shown in FIG. 1. Additionally or alternatively, the interface 2170 may include a mobile high-definition link (MHL) interface, an SD card/multi-media card (MMC) interface, or an infrared data association (IrDA) interface, for example.

The audio module 2180 may convert sound into an electrical signal or vice versa. At least some components of the audio module 2180 may be included in the input and output interface 140 shown in FIG. 1. The audio module 2180 may process sound information input or output through a speaker 2182, a receiver 2184, an earphone 2186, or the microphone 2188, for example.

The camera module 2191 may capture still pictures and video, and according to an embodiment of the present invention, it is possible to include one or more image sensors (such as a front sensor or rear sensor), lens, an image signal processor (ISP), or a flash (e.g., an LED or a xenon lamp).

The power management module 2195 may manage the power of the electronic device 2100. The power management module 2195 may include a power management integrated circuit (PMIC), a charger IC, or a battery gauge, for example.

The PMIC may be included in an IC or an SoC semiconductor, for example. Charging techniques may be classified into wired and wireless techniques. The charger IC may charge the battery and prevent overvoltage or overcurrent from a charger. According to an embodiment of the present invention, the charger IC may include a charger IC for at least one selected from the group consisting of a wired charging technique and a wireless charging technique. The wireless charging technique includes, for example, a magnetic resonance type, a magnetic induction type, or an electromagnetic wave type, and an additional circuit for wireless charging may be added such as a coil loop, a resonance circuit, or a rectifier.

The battery gauge may measure the level, current, or temperature of the battery 2196, or the voltage of the battery 2196 during charging, for example. The battery 2196 may store or generate electricity and use stored or generated electricity to supply power to the electronic device 2100. The battery 2196 may include a rechargeable battery or a solar battery, for example.

The indicator 2197 may show the specific states of the electronic device 2100 or a portion (e.g., the AP 2110) of the electronic device, such as, for example, a booting state, a message state, and a charged state. The motor 2198 may convert an electrical signal into mechanical vibration. The electronic device 2100 may include a processing device (e.g., a GPU) for supporting a mobile TV. The processing device for supporting the mobile TV may process media data according to a standard, such as, for example, digital multimedia broadcasting (DMB), digital video broadcasting (DVB), or media flow.

Each of the above-described elements of the electronic device according to embodiments of the present invention may include one or more components, and the names of corresponding elements may vary depending on the category of an electronic device. The electronic device, according to embodiments of the present invention, may include at least one of the above-described elements and some elements may be left out or other elements may be included. Also, some of the elements of the electronic device, according to embodiments of the present invention, are combined to form an entity, which may perform the same functions of corresponding elements before being combined.

The term "module", as used herein, may mean a unit including one of hardware, software, and firmware, or a combination of two or more thereof, for example. The term "module" may be interchangeably used with the term "unit", "logic", "logical block", "component", or "circuit", for example. A module may be an elementary unit of or a portion of an integral component. A module may also be an elementary unit for performing one or more functions or a portion of the elementary unit. A module may be implemented mechanically or electronically. For example, a module, according to an embodiment of the present invention, may include at least one of an application-specific integrated circuit (ASIC) chip, a field-programmable gate array (FPGA), and a programmable-logic device performing some operations that have been known or will be developed.

According to an embodiment of the present invention, at least some of devices (such as modules or their functions) or methods (such as operations) may be implemented as commands stored in a computer-readable storage medium in the form of a programming module, for example. When the command is executed by one or more processors (such as the processor 120), the one or more processors may perform a function corresponding to the command. The computer readable storage medium may be the memory 130, for example. At least a portion of the programming module may be implemented (e.g., performed) by the processor 120. At least a portion of the programming module may include a module, a program, a routine, a set of instructions, or a process for executing one or more functions, for example.

According to an embodiment of the present invention, a computer readable recording medium may include a command stored in a computer readable storage medium as a programming module. The command may be set to perform an operation of displaying a composition selection guide including at least one composition item corresponding to at least one object in a related image, on at least one display functionally connected to the electronic device, an operation of receiving an input relating to selecting the at least one composition item, an operation of acquiring at least one composition image corresponding to the at least one composition item selected by the input, and an operation of displaying the at least one composition image on the at least one display.

The computer readable recording medium may include a magnetic medium such as a hard disk, a floppy disk and a magnetic tape, an optical medium such as a compact disc read only memory (CD-ROM) and a DVD, a magneto-optical medium such as a floptical disk, and a hardware device that is especially configured to store and execute a program command (such as, a programming module), such as a ROM, a RAM, and a flash memory. Also, the program command may include a machine code made by a compiler as well as a high-level language code that may be executed by a computer by using an interpreter. The above-described hardware device may be configured to operate by one or more software modules to execute the operations of the present disclosure and vice versa.

A module or programming module according to various embodiments of the present disclosure may include at least one of the above-described elements, and other elements may be included. Operations executed by a module, programming module or another element, according to an embodiment of the present invention, may be executed by using a sequential, parallel, repetitive, or heuristic method. Also, the orders in which some operations are performed may vary, some operations may be left out or further operations may be added.

While the invention has been shown and described with reference to certain embodiments thereof, it will be understood by those skilled in the art that various changes inform and detail may be made therein without departing from the spirit and scope of the invention as defined by the appended claims.

What is claimed is:

1. An electronic device comprising:
   a memory configured to store a composition selection guide that comprises at least one composition item relating to at least one object in an image; and
   a processor connected to the memory, and configured to display at least one composition image corresponding to a composition item, when a change value of the at least one object is greater than or equal to a predetermined value and the composition item is selected from the at least one composition item of composition selection guide,
   wherein when the at least one object is in contact with at least one edge of a display, an angle of view and a zoom function of an image collection module is altered,
   wherein the processor is further configured to display a plurality of composition images corresponding to a plurality of composition item selections, and
   wherein the processor is further configured to adjust attributes of the plurality of composition images, based on at least one of an attribute of an object corresponding to the selected composition item or a composition item selection order.

2. The electronic device of claim 1, wherein the processor is further configured to display the composition selection guide, and the at least one composition item comprises at least one of a first composition item set to display a first composition image enlarging at least a portion of an object, a second composition item set to display a second composition image reducing at least a portion of the object, and a third composition item set to display a third composition image comprising a region changed to comprise a portion or an entirety of the object.

3. The electronic device of claim 1, wherein the processor is further configured to display the composition selection guide, and the at least one composition item comprises a composition item set to display a composition image, corresponding to an object, at a specific position and with a specific size.

4. The electronic device of claim 1, wherein the processor is further configured display the composition selection guide, and the at least one composition item comprises a composition item set to display a composition image comprising an object recognized based on specified feature values.

5. The electronic device of claim 1, wherein the processor is further configured to display the composition selection guide, and the at least one composition item comprises a composition item set to display a composition image comprising a specific region relating to a position of an input event on the display.

6. The electronic device of claim 1, wherein the processor is further configured to display an additional composition item corresponding to the at least one object, according to at least one of a first input corresponding to a selection of the at least one composition item and a second input corresponding to a selection of the at least one object.

7. The electronic device of claim 1, wherein the processor is further configured to display the image on a first display and to display the composition selection guide on a second display.

8. The electronic device of claim 1, wherein the processor is further configured to display guide information when a position change or a shape change of an object matches a composition item in the composition selection guide.

9. A method for image processing comprising:
   displaying, by a processor, a composition selection guide comprising at least one composition item corresponding to at least one object in an image, on at least one display connected to the electronic device when a change value of the at least one object is greater than or equal to a predetermined value;
   receiving, by the processor, an input relating to a selection of a composition item from the at least one composition item of the composition selection guide;
   acquiring, by the processor, at least one composition image corresponding to the composition item; and
   displaying, by the processor, the at least one composition image on the at least one display,
   wherein when the at least one object is in contact with at least one edge of a display, an angle of view and a zoom function of an image collection module is altered,
   wherein the processor is further configured to display a plurality of composition images corresponding to a plurality of composition item selections, and
   wherein the processor is further configured to adjust attributes of the plurality of composition images, based on at least one of an attribute of an object corresponding to the selected composition item or a composition item selection order.

10. The method of claim 9, further comprising displaying at least one sub composition item relating to another composition of an object, when the composition item or the object is selected.

11. The method of claim 9, wherein displaying the composition selection guide comprises displaying the image on a first display and displaying the composition selection guide on a second display connected to the first display.

12. The method of claim 9, wherein displaying the at least one composition image comprises displaying a composition image in which a region of a frame having no data is replaced with predetermined regions of other frames.

13. The method of claim 9, wherein:
   the at least one composition image has at least one of an image size, a resolution, and a frame rate that is processed differently than the image; or
   a composition image of the at least one composition image has at least one of an object, an angle of view, or a magnification of zoom that is different from the composition item.

14. The method of claim 9, wherein:
the composition item corresponds to an event relating to a change of an eyeball of a user; or
directions are output when a position change or shape change of the at least one object matches a composition item in the composition selection guide.

15. The method of claim 9, further comprising:
recognizing an object comprising specified feature values among the at least one object,
wherein the composition selection guide comprises a composition item corresponding to the recognized object.

16. A non-transitory computer readable recording medium comprising a command stored in a computer readable storage medium as a programming module, wherein the command is set to:
display a composition selection guide comprising at least one composition item corresponding to at least one object in an image, on at least one display when a change value of the at least one object is greater than or equal to a predetermined value;
receive an input relating to a selection of a composition item from the at least one composition item of the composition selection guide;
acquire at least one composition image corresponding to the composition item; and
display the at least one composition image on the at least one display,
wherein when the at least one object is in contact with at least one edge of a display, an angle of view and a zoom function of an image collection module is altered,
wherein the processor is further configured to display a plurality of composition images corresponding to a plurality of composition item selections, and
wherein the processor is further configured to adjust attributes of the plurality of composition images, based on at least one of an attribute of an object corresponding to the selected composition item or a composition item selection order.

* * * * *